US010820209B2

(12) United States Patent
Raghothaman et al.

(10) Patent No.: US 10,820,209 B2
(45) Date of Patent: Oct. 27, 2020

(54) LICENSED-ASSISTED ACCESS (LAA) IN A C-RAN

(71) Applicant: CommScope Technologies LLC, Hickory, NC (US)

(72) Inventors: Balaji B Raghothaman, Chester Springs, PA (US); Irfaan Ahamed Salahuddeen, Acton, MA (US); Vedat Eyuboglu, Weston, MA (US); Nagi Jayaraman Mahalingam, San Diego, CA (US); Fatemeh Fazel Sarjoui, Somerville, MA (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 16/264,388

(22) Filed: Jan. 31, 2019

(65) Prior Publication Data

US 2019/0239083 A1 Aug. 1, 2019

Related U.S. Application Data

(60) Provisional application No. 62/625,033, filed on Feb. 1, 2018.

(51) Int. Cl.
*H04W 16/14* (2009.01)
*H04W 74/08* (2009.01)
*H04W 84/04* (2009.01)

(52) U.S. Cl.
CPC ....... *H04W 16/14* (2013.01); *H04W 74/0808* (2013.01); *H04W 84/042* (2013.01)

(58) Field of Classification Search
CPC ..... H04W 88/06; H04W 28/08; H04W 28/22; H04W 28/0236; H04W 16/14; H04W 74/0808; H04L 1/0015; H04L 1/0002
See application file for complete search history.

(56) References Cited

U.S. PATENT DOCUMENTS

| | | | |
|---|---|---|---|
| 7,933,619 B2 | 4/2011 | Kim | |
| 7,983,672 B2 | 7/2011 | Humblet et al. | |
| 8,160,629 B2 | 4/2012 | Mate et al. | |
| 8,170,598 B2 | 5/2012 | Raghothaman et al. | |
| 8,229,397 B2 | 7/2012 | Hou et al. | |
| 8,340,636 B2 | 12/2012 | Yin et al. | |
| 8,503,342 B2 | 8/2013 | Richardson | |
| 8,688,809 B2 | 4/2014 | Ch'ng et al. | |
| 8,774,134 B2 | 7/2014 | Raghothaman et al. | |

(Continued)

FOREIGN PATENT DOCUMENTS

| | | |
|---|---|---|
| KR | 1020160030035 A | 3/2016 |
| WO | 2016153306 A1 | 9/2016 |

(Continued)

OTHER PUBLICATIONS

Interdigital, "Cellular-Wi-Fi Integration a comprehensive analysis of the technology and standardization roadmap", Jun. 2012; pp. 1-26.

(Continued)

*Primary Examiner* — Anez C Ebrahim
(74) *Attorney, Agent, or Firm* — Fogg & Powers LLC

(57) ABSTRACT

Embodiments of a C-RAN are disclosed that support using Licensed-Assisted Access (LAA) deliver Long-Term Evolution (LTE) wireless service using unlicensed radio frequency (RF) spectrum.

27 Claims, 8 Drawing Sheets

(56) References Cited

U.S. PATENT DOCUMENTS

| | | |
|---|---|---|
| 8,873,512 B2 | 10/2014 | Richardson et al. |
| 9,078,284 B2 | 7/2015 | Richardson |
| 9,166,799 B2 | 10/2015 | Kim |
| 9,210,569 B2 | 12/2015 | Chiussi et al. |
| 9,876,670 B2 | 1/2018 | Richardson et al. |
| 2014/0293970 A1 | 10/2014 | Damnjanovic et al. |
| 2015/0049715 A1 | 2/2015 | Yerramalli et al. |
| 2016/0037550 A1 | 2/2016 | Barabell et al. |
| 2016/0095110 A1* | 3/2016 | Li ................ H04W 72/1215 370/329 |
| 2016/0234726 A1 | 8/2016 | Nuggehalli et al. |
| 2016/0255676 A1* | 9/2016 | Vajapeyam ........... H04W 16/14 370/329 |
| 2016/0338068 A1 | 11/2016 | Cheng et al. |
| 2017/0041859 A1 | 2/2017 | Martin et al. |
| 2017/0094681 A1 | 3/2017 | Takeda et al. |
| 2017/0099625 A1 | 4/2017 | Li et al. |
| 2017/0118133 A1 | 4/2017 | Meylan et al. |
| 2017/0339721 A1 | 11/2017 | Mukherjee et al. |
| 2018/0167993 A1 | 6/2018 | Thakkar et al. |
| 2018/0199394 A1 | 7/2018 | Teyeb et al. |

FOREIGN PATENT DOCUMENTS

| | | |
|---|---|---|
| WO | 2016176481 A1 | 11/2016 |
| WO | 2016190902 A1 | 12/2016 |
| WO | 2017010764 A1 | 1/2017 |
| WO | 2017105306 A1 | 6/2017 |
| WO | 2018111929 A1 | 6/2018 |

OTHER PUBLICATIONS

Paolini et al., "LTE unlicensed and Wi-Fi: Moving beyond coexistence", Published Dec. 24, 2015 by Senza Fili Consulting. Retrieved from http://noc.ucsc.edu/docs/Wi-Fi/LTEU-LTELAA-2015.pdf; pp. 1-85.

U.S. Patent and Trademark Office, "Notice of Allowance", U.S. Appl. No. 15/839,669, dated Sep. 11, 2019, pp. 1-10, Published: US.

U.S. Patent and Trademark Office, "Notice of Allowance", U.S. Appl. No. 15/839,669, dated Feb. 6, 2019, pp. 1-15, Published: US.

Burbudge, "Liaison from 3GPP on LWA and LWIP", Intel Corporation, Mar. 11, 2016, pp. 1-25, IEEE.

International Searching Authority, "International Search Report and Written Opinion from PCT Application No. PCT/US2017/065895 dated Mar. 26, 2018", from Foreign Counterpart to U.S. Appl. No. 15/839,669, filed Mar. 26, 2018, pp. 1-17, Published: WO.

"Discussion of hidden node problem of LAA", 3GPP TSG RAN WG1 Meeting #80, Feb. 2015, pp. 1-4, Athens, Greece.

AT&T, "At&T Reaches Wireless Speeds of More than 750 Mbps with LTE Licensed Assisted Access (LTE-LAA) Field Trials", Jun. 26, 2017, pp. 1-5, San Francisco, CA.

FCC, "Revision of Parts 2 and 15 of the Commission's Rules to Permit Unlicensed National Information Infrastructure (U-NII) devices in the 5GHz band", Federal Communications Commission, FCC 03-287; Nov. 18, 2003.

Fullmer et al., "Solutions to Hidden Terminal Problems in Wireless Networks", Computer Engineering Department University of California, Aug. 1997, pp. 1-11, Santa Cruz, CA.

International Searching Authority, "International Search Report and Written Opinion from PCT Application No. PCT/US2019/016159 dated May 17, 2019", from Foreign Counterpart to U.S. Appl. No. 16/264,388, pp. 1-13, Published: WO.

ITU-R, "Guidelines for evaluation of radio interface technologies for IMT-Advanced", M Series Mobile, radiodetermination, amateur and related satellites services, Dec. 2009, pp. 1-72, International Telecommunication Union.

Kudo et al., "User Equipment Centric Downlink Access in Unlicensed Spectrum for Heterogeneous Mobile Network", IEICE Transactions on Communications, Oct. 2015, pp. 1969-1977, The Institute of Electronics, Information and Communication Engineers.

Lee et al., "Performance Analysis of License Assisted Access LTE with Asymmetric Hidden Terminals", Dec. 13, 2016, pp. 1-14.

Li et al., "Modeling and Analyzing the Coexistence of Wi-Fi and LTE in Unlicensed Spectrum", IEEE Transactions on Wireless Communications, Oct. 2015, pp. 1-32, IEEE.

Qualcomm, "Qualcomm Research LTE in Unlicensed Spectrum: Harmonious Coexistence with Wi-Fi", Jun. 2014, pp. 1-19, Qualcomm Technologies, Inc.

Sagari et al., "Coordinated Dynamic Spectrum Management of LTE-U and Wi-Fi Networks", IEEE International Symposium on Dynamic Spectrum Access Networks (DySPAN), 2015, pp. 209-220, IEEE.

T-Mobile Newsroom, "Samsung Galaxy S8 Will be Twice as Fast in Hundreds of Cities on T-Mobile's Advanced LTE Network", Mar. 28, 2017, pp. 1-16, T-Mobile.

T-Mobile Newsroom, "T-Mobile Completes Nation's First Live Commercial Network Test of License Assisted Access (LAA)", Jun. 25, 2017, pp. 1-4, T-Mobile.

U.S. Patent and Trademark Office, "Notice of Allowance", U.S. Appl. No. 15/839,669, dated May 23, 2019, pp. 1-12, Published: US.

U.S. Patent and Trademark Office, "Notice of Allowance", U.S. Appl. No. 15/839,669, filed Dec. 23, 2019, pp. 1-11, Published: US.

European Patent Office, "Extended European Search Report from EP Application No. 17882089.0", from Foreign Counterpart to U.S. Appl. No. 15/839,669, dated Apr. 3, 2020, pp. 1 through 10, Published: EP.

Sirotkin et al., "LTE-WLAN Aggregation (LWA): Benefits and Deployment Considerations", White Paper, Apr. 1, 2016, pp. 1 through 22, Intel.

* cited by examiner

LICENSED-ASSISTED ACCESS (LAA) IN A C-RAN

CROSS-REFERENCE TO RELATED APPLICATIONS

This application claims the benefit of U.S. Provisional Patent Application Ser. No. 62/625,033, titled "LICENSED-ASSISTED ACCESS (LAA) IN A C-RAN" and filed on Feb. 1, 2018, which is hereby incorporated herein by reference.

BACKGROUND

Licensed-Assisted Access (LAA) is one approach to using unlicensed radio frequency (RF) spectrum in order to deliver Long-Term Evolution (LTE) wireless service. LAA has been proposed as an alternative to other schemes for using unlicensed RF spectrum to provide LTE wireless service, such as Long Term Evolution Unlicensed (LTE-U) and LTE and Wi-Fi Link Aggregation (LWA).

LAA is a special case of the carrier aggregation framework, where there is a primary licensed carrier, through which an item of user equipment (UE) connects to the network, and a secondary unlicensed carrier, which is used by the network to provide additional data capacity to the UE. All control signaling between the network and the UE is done through the primary carrier, while data can be transmitted either through the primary or the LAA unlicensed carrier.

The LAA secondary carrier is unlicensed, and hence is subject to the regulations that govern the use of unlicensed carriers. The 3GPP standards for LAA specify that a listen-before-talk (LBT) channel access procedure be used to ensure that any single device does not use an unlicensed carrier for an excessive amount of time.

It is expected that future versions of LAA will support bi-directional communication over a LAA secondary carrier using time-division duplexing (TDD). However, the early version of LAA (for example, the version set forth in the R13 version of the LTE specification) only defines how communications in the downlink are to be performed. That is, with that early LAA version, downlink transmissions to a UE may occur over the LAA secondary channel, but uplink transmissions from the UE may not occur over the LAA secondary channel. Even acknowledgments for downlink transmissions are transmitted by the UE on the uplink of the primary licensed channel. It is expected that future versions of LAA (for example, the versions set forth in the R14 and later versions of the LTE specification) will define how communications in the uplink are to be performed.

Generally, LAA is not designed for use with a base station (more specifically, an LTE Evolved Node B or "eNodeB" or "eNB") that is implemented using a distributed architecture. Typically, such a distributed architecture uses a centralized controller and multiple distributed radio points. This architecture is also referred to as a "cloud" or "centralized" radio access network or "C-RAN."

If LAA were to be used with multiple radio points, with all the radio points using the same physical cell identifier (PCI) for the LAA secondary carrier, the LBT procedure would typically need to be performed in a coordinated manner across all of the radio points. This would likely result in added complexity and reduced performance (for example, from having to align transmission bursts made by multiple radio points or alternatively having only a single radio point make a transmission burst at a time).

Also, the LBT procedure would introduce complications into the Layer 2 scheduling of such transmission bursts where the node that implements the scheduler is physically separated from the radio point where the LBT procedure is performed. This is the case when the eNodeB is implemented as a C-RAN. There is latency associated with communicating status information about the LBT procedure from each radio point to the centralized node that implements the scheduler. This latency must be taken into account by the scheduler.

SUMMARY

One embodiment is directed to a system to provide wireless service using one or more licensed radio frequency (RF) channels and one or more unlicensed RF channels. The system comprises a controller and a plurality of radio points. Each of the radio points is associated with at least one antenna and remotely located from the controller, wherein the plurality of radio points is communicatively coupled to the controller. The controller and the plurality of radio points are configured to implement a base station in order to provide wireless service to a plurality of user equipment (UEs) on a primary cell using said one or more licensed RF channels. The controller is configured to schedule transmissions on said one or more licensed RF channels and said one or more unlicensed RF channels. The controller is communicatively coupled to a core network of a wireless service provider. At least some of the radio points are configured to transmit and receive RF signals to and from the UEs using said one or more licensed RF channels. At least some of the radio points are configured to transmit RF signals to at least some of the UEs using said one or more unlicensed RF channels, each of said at least some of the radio points is configured to use a listen-before-talk (LBT) channel access process to gain access to said one or more unlicensed RF channels. Each of said at least some of the radio points that are configured to transmit RF signals to at least some of the UEs using said or more unlicensed RF channels is configured do the following in response to a request sent by the controller to said radio point to perform the LBT channel access process to attempt to gain access to said one or more unlicensed RF channels in order to transmit a burst starting at or before a first transmission time interval (TTI): if said radio point is successful in gaining access to said one or more unlicensed RF channels in order to transmit the burst starting at or before the first TTI, transmit, on said one or more unlicensed RF channels, the burst starting at or before the first TTI, and, if said radio point is unsuccessful in gaining access to said one or more unlicensed RF channels in order to transmit the burst starting at or before the first TTI, not transmit, on said one or more unlicensed RF channels, the burst starting at or before the first TTI, re-process at least some data included in the burst for transmission starting at or before a later TTI, and transmit the burst with the re-processed data starting at or before the later TTI.

Another embodiment is directed to a system to provide wireless service using one or more licensed radio frequency (RF) channels and one or more unlicensed RF channels. The system comprises a controller and a plurality of radio points. Each of the radio points is associated with at least one antenna and remotely located from the controller, wherein the plurality of radio points is communicatively coupled to the controller. The controller and the plurality of radio points are configured to implement a base station to provide wireless service to a plurality of user equipment (UEs) on a primary cell using said one or more licensed RF channels. The controller is configured to schedule transmissions on said one or more licensed RF channels and said one or more unlicensed RF channels. The controller is communicatively coupled to a core network of a wireless service provider. At least some of the radio points are configured to transmit and receive RF signals to and from the UEs using said one or more licensed RF channels. At least some of the radio points are configured to transmit RF signals to at least some of the UEs using said one or more unlicensed RF channels, each of said at least some of the radio points is configured to use a listen-before-talk (LBT) channel access process to gain access to said one or more unlicensed RF channels. Each of said at least some of the radio points that are configured to transmit RF signals to at least some of the UEs using said or more unlicensed RF channels is configured do the following in response to a request sent by the controller to said radio point to perform the LBT channel access process to attempt to gain access to said one or more unlicensed RF channels in order to transmit a burst starting at or before a first transmission time interval (TTI), the burst including first data scheduled to be transmitted before or during the first TTI: if said radio point is successful in gaining access to said one or more unlicensed RF channels in order to transmit the burst starting at or before the first transmission time interval (TTI), transmit, on said one or more unlicensed RF channels, the burst starting at or before the first TTI, and, if said radio point is unsuccessful in gaining access to said one or more unlicensed RF channels in order to transmit the burst starting at or before the first TTI, not transmit, on said one or more unlicensed RF channels, the first data as a part of the burst and transmit, on said one or more unlicensed RF channels, other data scheduled to be transmitted during the burst after the first TTI. The controller is configured to retransmit from said radio point, on said one or more unlicensed RF channels, the first data in response to a failure to receive at the controller an acknowledgment sent from a UE in response to receiving the first data.

Another embodiment is directed to a method of providing wireless service using one or more licensed radio frequency (RF) channels and one or more unlicensed RF channels via a system comprising a controller and a plurality of radio points. Each of the radio points is associated with at least one antenna and remotely located from the controller. The plurality of radio points is communicatively coupled to the controller, wherein the controller and the plurality of radio points are configured to implement a base station in order to provide wireless service to a plurality of user equipment (UEs) on a primary cell using said one or more licensed RF channels. The controller is communicatively coupled to a core network of a wireless service provider. At least some of the radio points are configured to transmit and receive RF signals to and from the UEs using said one or more licensed RF channels. The method comprises scheduling, by the controller, transmissions on said one or more licensed RF channels and said one or more unlicensed RF channels and using, by at least some of the radio points that are configured to transmit RF signals to at least some of the UEs using said one or more unlicensed RF channels, a listen-before-talk (LBT) channel access process to gain access to said one or more unlicensed RF channels. The method further comprises, in response to a request sent by the controller to, each of said at least some of the radio points that are configured to transmit RF signals to at least some of the UEs using said or more unlicensed RF channels, to perform the LBT channel access process in order to attempt to gain access to said one or more unlicensed RF channels in order to transmit a burst starting at or before a first transmission time interval (TTI): if said radio point is successful in gaining access to said one or more unlicensed RF channels in order to transmit the burst starting at or before the first TTI, transmitting, on said one or more unlicensed RF channels, the burst starting at or before the first TTI; and if said radio point is unsuccessful in gaining access to said one or more unlicensed RF channels in order to transmit the burst starting at or before the first TTI, not transmitting, on said one or more unlicensed RF channels, the burst starting at or before the first TTI, re-processing at least some data included in the burst for transmission starting at or before a later TTI, and transmitting the burst with the re-processed data starting at or before the later TTI.

Another embodiment is directed to a method of providing wireless service using one or more licensed radio frequency (RF) channels and one or more unlicensed RF channels via a system comprising a controller and a plurality of radio points. Each of the radio points is associated with at least one antenna and remotely located from the controller. The plurality of radio points is communicatively coupled to the controller, wherein the controller and the plurality of radio points are configured to implement a base station in order to provide wireless service to a plurality of user equipment (UEs) on a primary cell using said one or more licensed RF channels. The controller is communicatively coupled to a core network of a wireless service provider. At least some of the radio points are configured to transmit and receive RF signals to and from the UEs using said one or more licensed RF channels. The method comprises scheduling, by the controller, transmissions on said one or more licensed RF channels and said one or more unlicensed RF channels and using, by at least some of the radio points that are configured to transmit RF signals to at least some of the UEs using said one or more unlicensed RF channels, a listen-before-talk (LBT) channel access process to gain access to said one or more unlicensed RF channels. The method further comprises, in response to a request sent by the controller to, each of said at least some of the radio points that are configured to transmit RF signals to at least some of the UEs using said or more unlicensed RF channels is configured do the following, to perform the LBT channel access process in order to attempt to gain access to said one or more unlicensed RF channels in order to transmit a burst starting at or before a first transmission time interval (TTI), the burst including first data scheduled to be transmitted before or during the first TTI: if said radio point is successful in gaining access to said one or more unlicensed RF channels in order to transmit the burst starting at or before the first transmission time interval (TTI), transmitting, on said one or more unlicensed RF channels, the burst starting at or before the first TTI; and if said radio point is unsuccessful in gaining access to said one or more unlicensed RF channels in order to transmit the burst starting at or before the first TTI, not transmitting, on said one or more unlicensed RF channels, the first data as a part of the burst and transmitting, on said one or more unlicensed RF channels, other data scheduled to be transmitted during the burst after the first TTI. The method further comprises retransmitting from said radio point, on said one or more unlicensed RF channels, the first data in response to a failure to receive at the controller an acknowledgment sent from a UE in response to receiving the first data.

Other embodiments are disclosed.

The details of various embodiments are set forth in the accompanying drawings and the description below. Other

DRAWINGS

DETAILED DESCRIPTION

Figure 1:
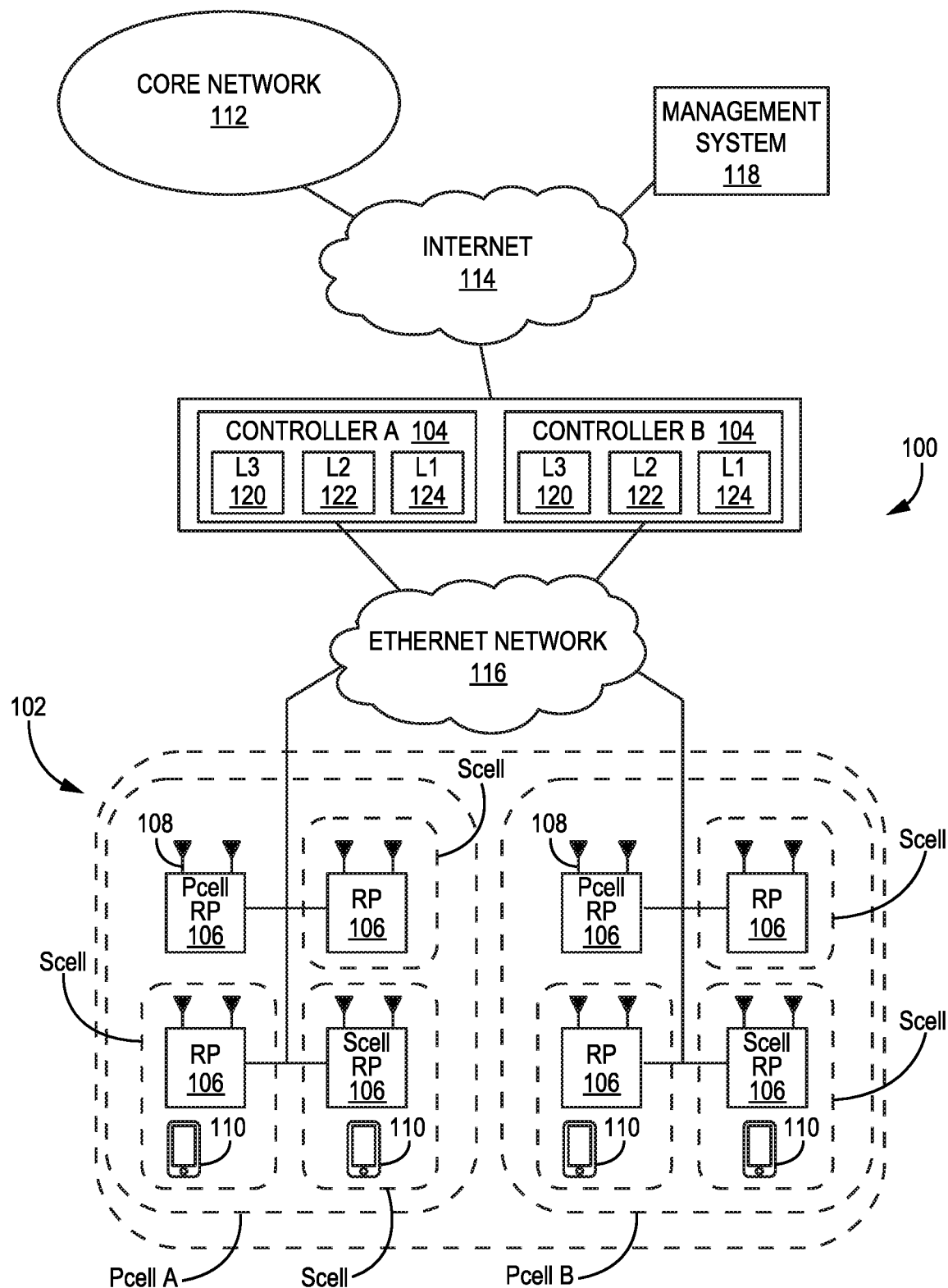
FIG. 1 is a block diagram illustrating one exemplary embodiment of a radio access network (RAN) system in which the Licensed-Assisted Access (LAA) techniques described here can be implemented.

FIG. 1 is a block diagram illustrating one exemplary embodiment of a radio access network (RAN) system 100 in which the Licensed-Assisted Access (LAA) techniques described here can be implemented. The system 100 is deployed at a site 102 to provide wireless coverage and capacity for one or more wireless network operators. The site 102 may be, for example, a building or campus or other grouping of buildings (used, for example, by one or more businesses, governments, other enterprise entities) or some other public venue (such as a hotel, resort, amusement park, hospital, shopping center, airport, university campus, arena, or an outdoor area such as a ski area, stadium or a densely-populated downtown area).

In the exemplary embodiment shown in FIG. 1, the system 100 is implemented at least in part using a C-RAN (point-to-multipoint distributed base station) architecture that employs at least one baseband unit 104 and multiple radio points (RPs) 106. The system 100 is also referred to here as a "C-RAN system" 100. The baseband units 104 are also referred to here as "baseband controllers" 104 or just "controllers" 104. Each RP 106 includes or is coupled to one or more antennas 108 via which downlink RF signals are radiated to user equipment (UE) 110 and via which uplink RF signals transmitted by UEs 110 are received.

More specifically, in the example shown in FIG. 1, each RP 106 comprises two antennas 108. Each RP 106 can include or be coupled to a different number of antennas 108.

The system 100 is coupled to the core network 112 of each wireless network operator over an appropriate back-haul. In the exemplary embodiment shown in FIG. 1, the Internet 114 is used for back-haul between the system 100 and each core network 112. However, it is to be understood that the back-haul can be implemented in other ways.

The exemplary embodiment of the system 100 shown in FIG. 1 is described here as being implemented as a Long Term Evolution (LTE) radio access network providing wireless service using an LTE air interface. LTE is a standard developed by 3GPP standards organization. In this embodiment, the controller 104 and RPs 106 together are used to implement an LTE Evolved Node B (also referred to here as an "eNodeB" or "eNB") that is used to provide user equipment 110 with mobile access to the wireless network operator's core network 112 to enable the user equipment 110 to wirelessly communicate data and voice (using, for example, Voice over LTE (VoLTE) technology).

Also, in this exemplary LTE embodiment, each core network 112 is implemented as an Evolved Packet Core (EPC) 112 comprising standard LTE EPC network elements such as, for example, a mobility management entity (MME) (not shown) and a Serving Gateway (SGW) (not shown) and, optionally, a Home eNodeB gateway (HeNB GW) (not shown) and a Security Gateway (SeGW) (not shown).

Moreover, in this exemplary embodiment, each controller 104 communicates with the MME and SGW in the EPC core network 112 using the LTE S1 interface and communicates with other eNodeBs using the LTE X2 interface. For example, the controller 104 can communicate with an outdoor macro eNodeB (not shown) via the LTE X2 interface.

Each controller 104 and the radio points 106 can be implemented so as to use an air interface that supports one or more of frequency-division duplexing (FDD) and/or time-division duplexing (TDD). Also, the controller 104 and the radio points 106 can be implemented to use an air interface that supports one or more of the multiple-input-multiple-output (MIMO), single-input-single-output (SISO), single-input-multiple-output (SIMO), multiple-input-single-output (MISO), and/or beam forming schemes. For example, the controller 104 and the radio points 106 can implement one or more of the LTE transmission modes. Moreover, the controller 104 and/or the radio points 106 can be configured to support multiple air interfaces and/or to support multiple wireless operators.

In the exemplary embodiment shown in FIG. 1, the front-haul that communicatively couples each controller 104 to the one or more RPs 106 is implemented using a standard ETHERNET network 116. However, it is to be understood that the front-haul between the controllers 104 and RPs 106 can be implemented in other ways.

Generally, one or more nodes in a C-RAN perform analog radio frequency (RF) functions for the air interface as well as digital Layer 1, Layer 2, and Layer 3 (of the Open Systems Interconnection (OSI) model) functions for the air interface.

In the exemplary embodiment shown in (L1) FIG. 1, each baseband controller 104 comprises Layer-3 (L3) functionality 120, Layer-2 (L2) functionality 122, and Layer-1 (L1) functionality 124 configured to perform at least some of the Layer-3 processing, Layer-2 processing, and Layer-1 processing, respectively, for the LTE air interface implemented by the RAN system 100, and each RP 106 includes (optionally) Layer-1 functionality (not shown) that implements any Layer-1 processing for the air interface that is not performed in the controller 104 and one or more radio frequency (RF) circuits (not shown) that implement the RF front-end functions for the air interface and the one or more antennas 108 associated with that RP 106.

Each baseband controller 104 can be configured to perform all of the digital Layer-3, Layer-2, and Layer-1 processing for the air interface, while the RPs 106 (specifically, the RF circuits) implement only the RF functions for the air interface and the antennas 108 associated with each RP 106. In that case, IQ data representing time-domain symbols for the air interface is communicated between the controller 104 and the RPs 106. Communicating such time-domain IQ data typically requires a relatively high data rate front haul. This approach (communicating time-domain IQ data over the front haul) is suitable for those implementations where the front-haul ETHERNET network 116 is able to deliver the required high data rate.

If the front-haul ETHERNET network 116 is not able to deliver the data rate needed to front haul time-domain IQ data (for example, where the front-haul is implemented using typical enterprise-grade ETHERNET networks), this issue can be addressed by communicating IQ data representing frequency-domain symbols for the air interface between the controllers 104 and the RPs 106. This frequency-domain IQ data represents the symbols in the frequency domain before the inverse fast Fourier transform (IFFT) is performed. The time-domain IQ data can be generated by quantizing the IQ data representing the frequency-domain symbols without guard band zeroes or any cyclic prefix and communicating the resulting compressed, quantized frequency-domain IQ data over the front-haul ETHERNET network 116. Additional details regarding this approach to communicating frequency-domain IQ data can be found in U.S. patent application Ser. No. 13/762,283, filed on Feb. 7, 2013, and titled "RADIO ACCESS NETWORKS," which is hereby incorporated herein by reference.

Where frequency-domain IQ data is front-hauled between the controllers 104 and the RPs 106, each baseband controller 104 can be configured to perform all of the digital Layer-3, Layer-2, and Layer-1 processing for the air interface except for the inverse fast Fourier transform (IFFT) in the downlink and the fast Fourier transform (FFT) in the uplink. In this case, the Layer-1 functions in each RP 106 can be configured to implement the digital Layer-1 processing for the air interface that is not performed in the controller 104 (that is, the IFFT in the downlink and the FFT in the uplink).

Where the front-haul ETHERNET network 116 is not able to deliver the data rate need to front haul (uncompressed) time-domain IQ data, the time-domain IQ data can be compressed prior to being communicated over the ETHERNET network 116, thereby reducing the data rate needed communicate such IQ data over the ETHERNET network 116.

Data can be front-hauled between the controllers 104 and RPs 106 in other ways (for example, using front-haul interfaces and techniques specified in the Common Public Radio Interface (CPRI) and/or Open Base Station Architecture Initiative (OBSAI) family of specifications).

Each controller 104 and RP 106 (and the functionality described as being included therein) can be implemented in hardware, software, or combinations of hardware and software, and the various implementations (whether hardware, software, or combinations of hardware and software) can also be referred to generally as "circuitry" or a "circuit" configured to implement at least some of the associated functionality. When implemented in software, such software can be implemented in software or firmware executing on one or more suitable programmable processors. Such hardware or software (or portions thereof) can be implemented in other ways (for example, in a field programmable gate array (FPGA), application specific integrated circuit (ASIC), etc.). Also, the RF functionality can be implemented using one or more RF integrated circuits (RFICs) and/or discrete components. Each controller 104 and RP 106 can be implemented in other ways.

In the exemplary embodiment shown in FIG. 1, a management system 118 is communicatively coupled to the controllers 104 and RPs 106, for example, via the Internet 114 and ETHERNET network 116 (in the case of the RPs 106).

In the exemplary embodiment shown in FIG. 1, the management system 118 communicates with the various elements of the system 100 using the Internet 114 and the ETHERNET network 116. Also, in some implementations, the management system 118 sends and receives management communications to and from the controllers 104, each of which in turn forwards relevant management communications to and from the RPs 106.

The system 100 is configured to use unlicensed RF spectrum to deliver LTE wireless service using Licensed-Assisted Access (LAA).

In the exemplary embodiment shown in FIG. 1, each controller 104 is configured to support a single primary cell (Pcell) that uses licensed RF spectrum and multiple RPs 106 where each of those multiple RPs 106 are associated with the same primary cell Pcell and use the same physical cell identifier for that Pcell. Common control and reference signals are transmitted for the Pcell. Also, in this embodiment, each controller 104 is configured to support multiple secondary cells (Scells) that use unlicensed RF spectrum with LAA, where each Scell is used with a single RP 106 and has a separate physical cell identifier. Separate control and reference signals are transmitted for each Scell.

In the exemplary embodiment shown in FIG. 1, each RP 106 is configured to use only licensed RF spectrum, only unlicensed RF spectrum with LAA, or both licensed RF spectrum and unlicensed RF spectrum. However, it is to be understood that other embodiments can be implemented in other ways.

Each RP 106 that is configured to use only licensed RF spectrum with the shared Pcell is also referred to here as a "Pcell RP 106." Each RP 106 that is configured to use only unlicensed RF spectrum with LAA with a respective Scell is also referred to here as a "Scell RP 106." Each RP 106 that is configured to use both licensed RF spectrum and unlicensed RF spectrum is also referred to here as a "dual RP 106." Also, each RP 106 that is configured to use unlicensed RF spectrum (be it a Scell RP 106 that is configured to only use unlicensed RF spectrum or a dual RP 106 that is configured to use both licensed RF spectrum and unlicensed RF spectrum) is also referred to here as a "LAA RP 106."

Because each LAA secondary cell Scell is implemented using only a single LAA RP 106, each such LAA RP 106 is able to perform the LBT channel access procedure for LAA independently, without having to coordinate the LBT channel access procedure across the other LAA RPs 106. This typically results in less complexity and improved performance.

In this exemplary embodiment, each LAA RP 106 can be configured to support multiple LTE channels on licensed and unlicensed RF bands.

In this exemplary embodiment, in idle mode, each UE 110 monitors only licensed RF channels.

In this embodiment, a signature vector (SV) is determined for each UE 110 based on transmissions that occur for the primary cell Pcell. The controller 104 determines a signature vector for each active UE 110 based on receive power measurements made at each radio point 106 for that UE 110.

In general, when a UE 110 makes initial LTE Physical Random Access Channel (PRACH) transmissions to access the primary cell, each RP 106 will receive those initial PRACH transmissions. The controller 104 maintains a signature vector for each UE 110 that includes, for each RP 106 associated with the primary cell, a signal reception metric indicative of the power level received by that RP 106 from that UE 110 (for example, a signal-to-noise plus interference ratio (SNIR)). This signature vector is a measure of the UE's proximity to each RP 106 and is used to track the mobility of the UE 110. Initially, this SV will be based solely on the reception of the initial PRACH transmissions when the UE 110 first connects to the primary cell. As additional uplink transmissions from that UE 110 are received by the various RPs 106 in the primary cell, the controller 104 will update the signature vector for that UE 110 based on the relative received power of the UE's uplink channel at the RPs 106. In one implementation, each RP's entry in the signature vector for a given UE 110 is quantized to one of two values {0,1}, and the resulting signature vector is also referred to here as the "quantized signature vector" or "QSV" for that UE 110. In this embodiment, the QSV for each UE 110 is used to determine a primary RP 106 for that UE 110. The controller 104 communicates with all of the RPs 106 in the primary cell to carry out this signature vector-related processing. Additional details regarding determining the QSV for each UE 110 can be found in US Patent Publication No. 2016-0037550.

At connection set-up, the licensed channel on which the UE 110 sends its initial PRACH transmissions becomes the UE's 110 licensed primary cell Pcell. The controller 104 that is serving that primary cell may then add unlicensed secondary cells Scells to the UE's Radio Resource Control (RRC) configuration.

Where each RP 106 supports both licensed channels and unlicensed LAA channels, the controller 104 can be configured to select the unlicensed Scells at the beginning of a connection based on the primary RP 106 as determined by the QSV of the UE 100. That is, the RP 106 that is selected as the primary RP 106 for the primary cell Pcell can also be selected to provide the secondary cells Scells for that UE 110. Later in the connection, this assignment can be refined based on Neighbor Reports received from the UEs 110.

Where LAA-only RPs 106 (that is, Scell RPs 106) are used and are deployed separately from the RPs 106 that support only the licensed RF channels (that is, Pcell RPs 106, the controller 104 can be configured to determine which secondary cells Scells to add to a UE's RRC configuration based on Neighbor Reports from the UEs 110.

The serving controller 104 can also be configured to use load as a factor in determining which secondary cells Scells to add to a UE's RRC configuration.

Each UE 110 will also be configured with a Measurement Object. When LAA is used, the corresponding Measurement Object will include all the unlicensed cells nearby. UEs 110 will monitor and report the RF conditions of all the primary and secondary cells in the Measurement Object by sending a Neighbor Report, and the controller 104 can use this report to add or delete unlicensed secondary cells Scells using RRC configuration messages. When secondary cells Scells are added to a UE 110, mobility events related to the secondary cell Scell are handled by the Layer-3 functionality 120 in the controller 104.

Once one or more secondary cells Scells have been added to a UE's RRC configuration, the Layer-2 functionality 122 in the serving controller 104 can activate or de-activate these secondary cells Scells based on load by using MAC Control Elements sent on the primary cell Pcell. When a secondary cell Scell is activated, the UE 110 will start monitoring the physical downlink control channel (PDCCH) (or in the future the enhanced PDCCH (ePDCCH)) on the secondary cell Scell and also report CSI for the secondary cell Scell using the Physical Uplink Control Channel (PUCCH) and Physical Uplink Shared Channel (PUSCH) channels on the primary cell Pcell. Support for PUCCH Format 3 is required for 3-carrier LAA.

As noted above, with the R13 version of the LTE specification, downlink transmissions to a UE 110 may occur on a LAA secondary cell Scell, but uplink transmission from the UE 110 may not occur over the LAA secondary cell Scell and instead are communicated on the primary cell Pcell (including all uplink PUSCH data transmissions).

Discovery Reference Signals (DRS)

Connected UEs 110 need to maintain timing synchronization and monitor the reference signals on unlicensed RF channels. Since we cannot rely on unimpeded transmission of PSS/SSS and the reference signals CS-RS/CSI-RS due to the use LBT to access the secondary cell Scell, each RPs 106 that supports LAA will transmit a discovery reference signal (DRS) on all unlicensed RF channels when they are otherwise idle.

DRS transmissions occupy the first 12 orthogonal frequency-division multiplexing (OFDM) symbols in a single LTE Transmission Time Interval (TTI) and carry port-0 cell specific reference signals (CS-RS), Primary Synchronization Signals (PSS), Secondary Synchronization Signals (SSS), and Channel State Information Reference Signals (CSI-RS). DRS must be transmitted within a 6 subframe Discovery Maintenance Timing Configuration (DMTC) occasion, which is configured via RRC. DMTC occasions occur periodically once every 40, 80 or 160 milliseconds. The period and phase of the DRS can be configured in the Measurement Object. In this embodiment, the same DRS configuration is used for all connected UEs 110. However, the DMTC occasions of neighboring RPs 106 operating on the same unlicensed RF channel are offset relative to each other in order to avoid inter-RP DRS interference.

When an RP 106 is already transmitting a burst, the DRS transmission in a DMTC occasion is replaced by normal PSS/SSS transmission in subframes 0 and 5 and normal CS-RS/CSI-RS transmissions in all subframes. When an RP's DMTC occasion arrives when the RP 106 is idle and has no PDSCH data in its queue, it can be scheduled to transmit DRS. A RP 106 can grab an unlicensed RF channel using the more relaxed DRS LBT rules. When the start of the DMTC occasion is aligned with the start of a new burst, the RP 106 can be scheduled with a PDSCH transmission and try to access the unlicensed RF channel using the more stringent PDSCH access rules.

When a RP 106 is idle, channel sensing for the Discovery Signal should not start more than 25 microseconds before the start of the 1st subframe in the DMTC in order to avoid sending a reservation signal. The start of channel sensing can be pulled to earlier after a few unsuccessful attempts (up to 2 OFDM symbol intervals are available to send a reservation signal before the start of the discovery signal).

LAA PDSCH Burst Transmission Basics

RPs 106 transmit Physical Downlink Shared Channel (PDSCH) transmissions on unlicensed RF channels in bursts. There are two RRC configurations, referred to here as "{0}" and "{0, 7}", that determine the allowable starting position of such a burst. In RRC configuration {0}, burst transmissions can start on any TTI (subframe) boundary, whereas in RRC configuration {0, 7}, they can start on any slot boundary. LAA UEs 110 will support both RRC configurations.

An RP 106 can transmit on an unlicensed RF channel continuously a maximum of $T_{mcot}$ milliseconds, where $T_{mcot}$ is 2, 3, or 8 milliseconds, for priority access classes 1, 2, or 3, respectively. Maximum transmission time includes the transmission time $T_{res}$ of a reservation signal sent before the start of the PDSCH burst. That is, $T_{res}+T_{burst}<=T_{mcot}$. It can be assumed that:

$T_{res}$<1 milliseconds for RRC Configuration {0}, or
$T_{res}$<0.5 milliseconds for RRC Configuration {0, 7}.

In order to use all available transmission time, a burst transmission is allowed to end in a partial subframe. The duration of the last subframe (specified in a number of OFDM symbols) can be chosen from the following set: {3 symbols, 6 symbols, 9 symbols, 10 symbols, 11 symbols, 12 symbols, or 14 symbols}. This set corresponds to the set of allowable number of downlink symbols in a TDD special subframe. To send a partial subframe of duration less than 14 symbols in a TTI n, matching subframe configuration indices need to be signaled to the UE 110 in the last two subframes of the burst. This allows the UE 110 to determine the duration of the last subframe. The subframe configuration index (defined in 36.213 Table 13A-1 of the R13 version of the LTE specification) is sent using an enhanced Downlink Control Information (DCI) 1C to a common channel radio network temporary identifier (CC-RNTI) using aggregation level 4 or 8 in PDCCH Control Channel Element (CCE) positions 0-3 or 0-7, respectively.

If the UE 110 does not detect any subframe configuration indications in subframes n−1 and n, it will assume that subframe n is a full subframe. When the last subframe of a transmission burst is a full subframe, it is possible, but not necessary to send a subframe configuration indication.

A transmission burst that starts on a TTI boundary may be as short as 1 millisecond, but not shorter. In RRC configuration {0, 7}, when a transmission starts on the 2nd slot of a subframe, it cannot be shorter than 1.5 subframes. It is not necessary to signal the duration of the initial half subframe of the burst.

When an RP 106 has no data to transmit, it is configured to terminate the burst and relinquish the unlicensed channel. Ideally, the duration of the last subframe of a burst should be chosen as short as possible based on the remaining data demand for priority classes same or higher than the priority class used by the RP 106 in channel access. However, to ease implementation, a burst can be ended early with a full subframe, even when the data demand can be met with a partial subframe. This may avoid the need to determine the duration of the partial subframe 1 TTI earlier.

After completing a burst, a RP 106 may restart transmitting as early as in the next available subframe or slot boundary, as long as the LBT process can regain access to the unlicensed channel. In RRC configuration {0}, when a transmission burst of an RP 106 ends with a partial subframe, it may be possible for the RP 106 to regain access to the channel in the next subframe, especially when the last subframe of the previous burst was short (3 or 6 symbols). When the transmission burst ends in a subframe or a large partial subframe, the scheduler in the Layer-2 functionality 122 of the serving controller 104 may not schedule any UEs 110 on the secondary channel Scell for an RP 106 for 1 TTI.

In RRC configuration {0, 7}, the scheduler in the Layer-2 functionality 122 of the serving controller 104 can schedule UEs 110 on a secondary channel Scell for a RP 106 in the next TTI even when the last subframe of the previous burst was a full subframe. In this case, the LBT process will have nearly 500 microseconds to regain access to the unlicensed channel before the start of the 2nd slot of the next TTI.

Scell-Based QSV Management

In the exemplary embodiment described here in connection with FIG. 1, the Layer-3 functionality 120 is configured to use LTE UE Neighbor Reports to manage mobility between secondary cells served by different RPs 106. In this exemplary embodiment, the serving controller 104 is configured assign to a UE 110 at most two unlicensed secondary cells Scells that correspond to two contiguous unlicensed channels on the same LAA RP 106. In one implementation, the serving controller 104 is configured so that it may assign two unlicensed secondary cells Scells to a UE 110 that are provided by two different RPs 106. In another implementation, the serving controller 104 is configured to only assign two unlicensed secondary cells Scells to a UE 110 if they can be provided by a single RP 106 in order to simplify implementation.

For ease of explanation, the following description will focus on a situation where a single unlicensed secondary cell Scell is assigned to a UE 110. However, it is to be understood that the concepts described here can be extended to situations where two or more secondary cells Scells are assigned to a UE 110.

The L2 functionality 122 in the serving controller 104 maintains a single priority list for all UEs 110 served by that controller 104 for the associated licensed primary cell Pcell and manages the activation and de-activation of the secondary cells Scells for each served UE 110.

The L2 functionality 122 in the serving controller can also determine the UE's QSV for each secondary cell Scell based on the serving cell information provided by the L3 functionality 120.

In one implementation, for the QSV that is used for each secondary cell Scell assigned to a UE 110, each RP entry in the QSV is set to one of two values—either a value of "1" if the associated RP 106 is serving that secondary cell Scell to the UE 110 or a value "0" if the associated RP 106 is not serving that secondary cell Scell to the UE 110. In such an implementation where only a single RP 106 serves each secondary cell Scell, the system 100 can be configured to not implement L2 scheduler coordination for LAA.

In another implementation, the system 100 can be configured to implement L2 scheduler coordination for LAA. In such an implementation, "blanking" of a RP 106 can be supported by using a 3-level QSV for LAA, where each entry in the QSV (which is associated with a corresponding RP 106) has a value of "1" if the associated RP 106 is serving that secondary cell Scell to the UE 110, has a value of "0" (corresponding to the "0" value in a two-level QSV) if the associated RP 106 is not serving that secondary cell Scell to the UE 110 but is not near another RP 106 that is operating on the same unlicensed channel, and a "blank" value if the associated RP 106 is near another RP 106 that is operating on the same unlicensed channel.

The controller 104 will not use RPs 106 that have a blank value in the corresponding QSV for that secondary channel. Blanking will prevent neighboring RPs 106 that are operating on the same unlicensed channel from transmitting on the same RB when serving UEs 110 near the border of these RPs 106. These blank entries in a QSV can be determined based on UE Neighbor Reports for neighboring secondary cells Scells. For blanking, the D-algorithm used by the controller 104 needs to be enhanced to support 3-level QSVs.

When LAA UEs 110 support LTE Transmission Mode (TM) 10, Coordinated Multipoint (CoMP) can be used across neighboring RPs 106. In TM 10, UEs 110 can be configured to report a different Channel Quality Indicator (CQI) and Pre-Coding Matrix Indicator (PMI) for different RPs 106 operating on the licensed band, and we can introduce coordinated joint transmission across multiple RPs 106.

L2/L1 Operation in LAA

Method 1

In the exemplary embodiment shown in FIG. 1, the downlink L2 and L1 processing is pipelined. The downlink L2 and L1 processing that is being performed at any given point in time by the L2 functionality 122 and the L1 functionality 124 is as follows:

TTI N−4: L2 Prioritization
TTI N−3: L2 Scheduling/Resource Allocation
TTI N−2: L2 RLC/MAC processing
TTI N−1: L1 processing
TTI N: OTA That is, LTE Prioritization is being performed for TTI N−4 by the L2 functionality 122 in the server controller 104, LTE L2 Scheduling and Resource Allocation for TTI N−3 by the L2 functionality 122, LTE RLC/MAC processing is being performed for TTI N−2 by the L2 functionality 122, and LTE L1 processing is being performed for TTI N−1 by the L1 functionality in the serving controller 104 and the relevant RP 106, and TT1 N is being transmitted over the air by the relevant RP 106.

Since downlink transmissions on unlicensed channels occur in bursts, it is necessary for the controller 104 to keep track of the burst state of the secondary cells Scells used for such downlink transmissions and exchange LBT requests and indications with the associated RPs 106. In the following description, it is assumed that the radio frames in each RP 106 are aligned (for example, with GPS) and are offset by 0.25 milliseconds relative to the radio frames in the controller 104. In general, scheduling for downlink frames transmitted on the licensed channel is handled in a conventional manner.

Figure 2:
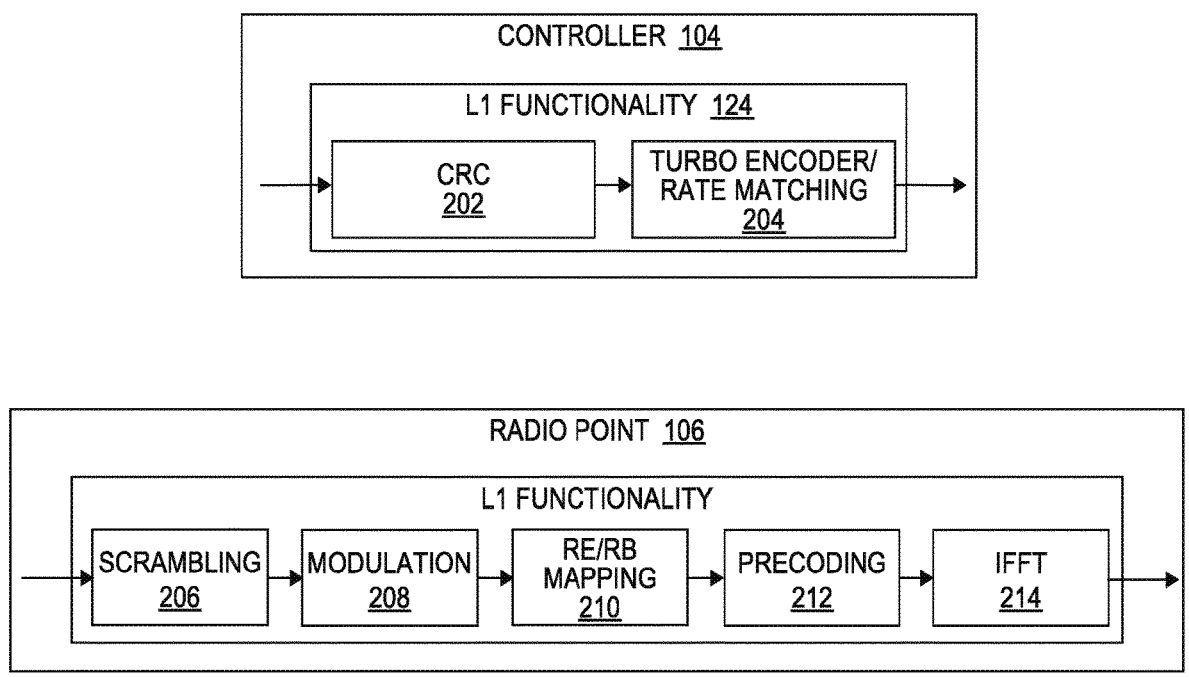
FIG. 2 is a block diagram illustrating one exemplary embodiment of a split in the Layer 1 between the controller and an associated radio point in the RAN of FIG. 1.

In this exemplary embodiment, the L1 processing is split (shown in FIG. 2) between the controller 104 and the associated RP 106 such that all PDSCH L1 processing up to and including rate matching 204 (including cyclic redundancy code (CRC) encoding 202) is implemented in the controller 104 and the remaining L1 processing is implemented in the RP 106 (including scrambling 206, modulation 208, resource element (RE)/resource block (RB) mapping 210, precoding 212, and the inverse fast Fourier transform (IFFT) 214). L1 PDCCH control channel processing is performed in the serving controller 104. In the following description, the L2 scheduler coordination between resource allocation on the licensed and unlicensed carriers will be ignored and instead will focus on resource allocation on a single unlicensed channel. Also, in the following description, it is assumed that the LBT priority class 3 and RRC configuration {0} are being used. Extensions to priority classes 1 and 2 and RRC configuration {0, 7} will be discussed later.

LBT Success Scenario

Figure 3:
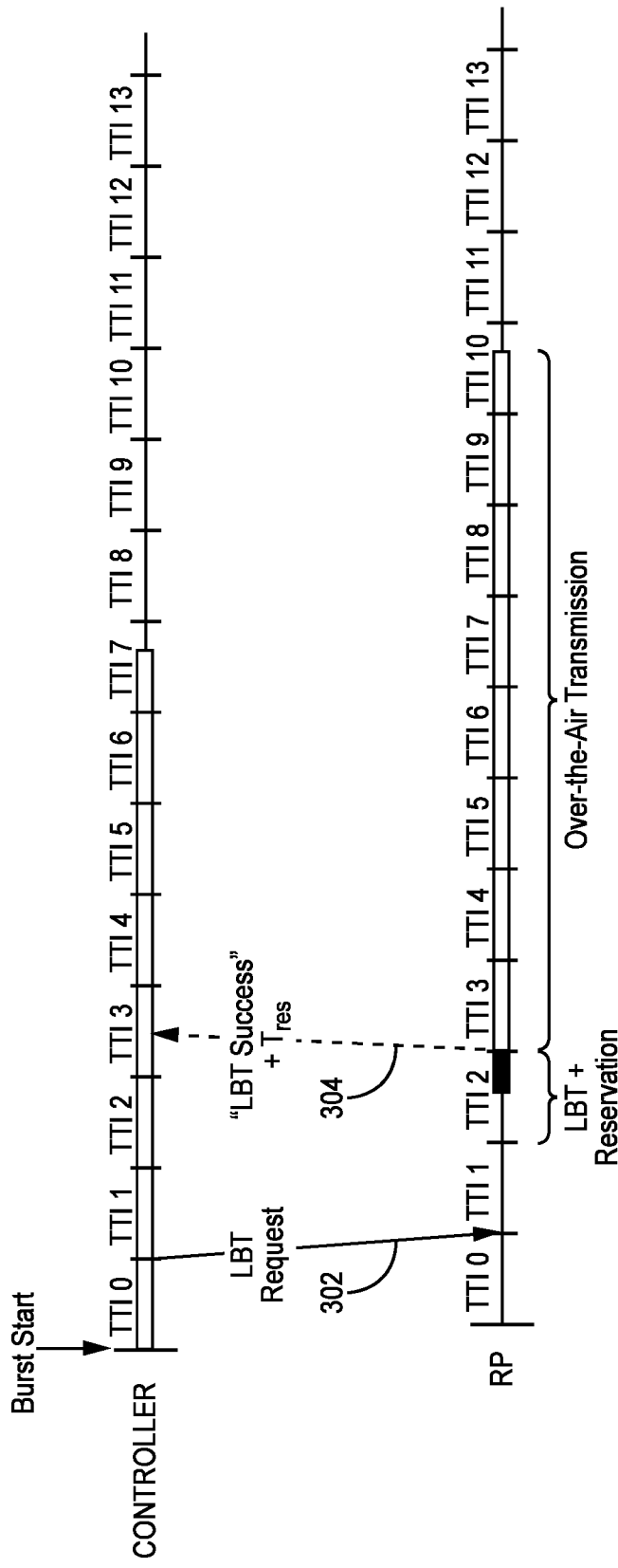
FIG. 3 is one example of a diagram for a burst transmission using LBT priority class 3 and RRC configuration {0} where the initial LBT channel access is successful.

FIG. 3 is one example of a diagram for a burst transmission using LBT priority class 3 and RRC configuration {0} where the initial LBT channel access is successful. After scheduling resource blocks (RBs) on a secondary cell Scell in the first TTI (TTI 0) of the burst, the scheduler in the L2 functionality 122 of the serving controller 104 sends an LBT Request indication 302 to the corresponding RP 106 requesting LBT for over-the-air (OTA) transmission in TTI 3. The LBT Request indication 302 includes a priority class, which the RP 106 uses to select the LBT parameters, and the Nina value. If there is enough data in the buffers, the L2 scheduler can allocate resources on the secondary cell Scell for the RP 106 for a new transmission burst for up to 4 TTIs without any LBT feedback from the RP 106.

Upon receiving the LBT request 302, the RP 106 has 2 milliseconds to gain access to the unlicensed channel for the secondary cell Scell prior to TTI 3, assuming a max fronthaul latency of 0.25 milliseconds. The RP 106 may choose the starting time of the LBT channel access attempt based on the Nina value, so as to minimize the duration of the reservation signal. This LBT channel access attempt may start as early as possible, except when the contention window is small (indicative of low load). When this is the case, the RP 106 may not send any reservation signal right away, and instead may look for an idle channel for a Defer Duration closer to the start of TTI 3 in order to minimize the overhead of the reservation signal. When the contention window is high (indicative of high load), the RP 106 may try to grab the unlicensed channel for the secondary cell Scell as early as possible by sending the reservation signal immediately after completing the LBT channel access attempt in TTI 2. After the RP 106 starts to transmit the burst, the RP 106 sends a LBT Success indication 304 to the controller 104 no later than at the start of TTI 3, along with an index that represents the duration $T_{res}$ of the reservation signal. The LBT feedback will arrive at the controller 104 in TTI 3, when the L2 scheduler in the L2 functionality 122 of the controller 104 may still be processing the 4th subframe of the burst.

Upon receiving the LBT Success indication 304, L2 scheduler in the controller 104 can continue to schedule RBs on the secondary cell Scell for that RP 106 for additional TTIs. The L2 scheduler in the controller 104 keeps track of the burst duration and determines the number of OFDM symbols in the last subframe of the burst based on the maximum allowed transmission duration, which it computes using the indication received for the reservation time $T_{res}$, and schedules UEs 110 accordingly.

When scheduling UEs 110 in a partial subframe of the secondary cell Scell at the end of a burst, the L2 scheduler in the controller 104 needs to choose the Modulation and Coding Scheme (MCS) such that the coding rate is not greater than 0.9875 bits per seconds (bps)/Hz (UEs 110 won't decode PDSCH if effective forward error correction (FEC) coding rate is greater than 0.931). For a given MCS and number of allocated RBs N, the Transport Block Size (TB S) in a partial subframe is determined in the same manner as in a full subframe. Since fewer Resource Elements (REs) are available in a partial subframe, FEC overhead will be reduced and this may increase the block error rate (BLER). To avoid this problem, the L2 scheduler in the serving controller 104 can select a lower MCS than what can be supported in a full subframe. For the same number of RBs, this will reduce the Transport Block size but will help maintain the same target BLER. When scheduling UEs 110 in a partial subframe at the end of a burst, the L2 scheduler in the controller 104 can also prepare the transmission of the subframe configuration indications in the last two subframes of the burst. These are sent to a common CC-RNTI in Format 1C DCIs over PDCCH.

If at any time during the burst transmission, the L2 functionality 122 in the controller 104 has no data to transmit on the secondary cell Scell of the RP 106, the L2 functionality 122 can terminate the burst in order to clear the channel. This can occur immediately after the allocation of the 1st subframe of the burst. To simplify the L2 design, the L2 functionality 122 can be configured to require all early terminations to always result in a full subframe at the end of the burst. This may avoid the complexity of scheduling subframe configuration indices in the previous subframe. If there is not enough data in the buffers and the L2 scheduler terminates the burst early (for example, after 1 subframe), it can wait for 1 TTI and start another burst as early as in TTI 2, and send a new LBT request to the RP 106. In other words, multiple transmission bursts can be pipelined.

Asynchronous downlink hybrid automatic repeat requests (HARQ) are used with LAA on unlicensed channels in the same manner as they are used for licensed LTE channels. There are 8 HARQ processes. Since a transmission burst never lasts longer than 8 subframes, a retransmission of a subframe in a given burst always occurs in another burst. Therefore, retransmissions may be delayed due to the LBT channel access process. However, such asynchronous retransmissions are already supported in the LTE downlink. HARQ feedback is always sent using PUCCH or PUSCH on the primary cell Pcell. To support LAA across 3 carriers, Format 3 PUCCH needs to be supported. Format 3 PUCCH is mandatory for UEs 110 that can support more than 3 aggregated channels.

LBT Failure Scenario

Figure 4:
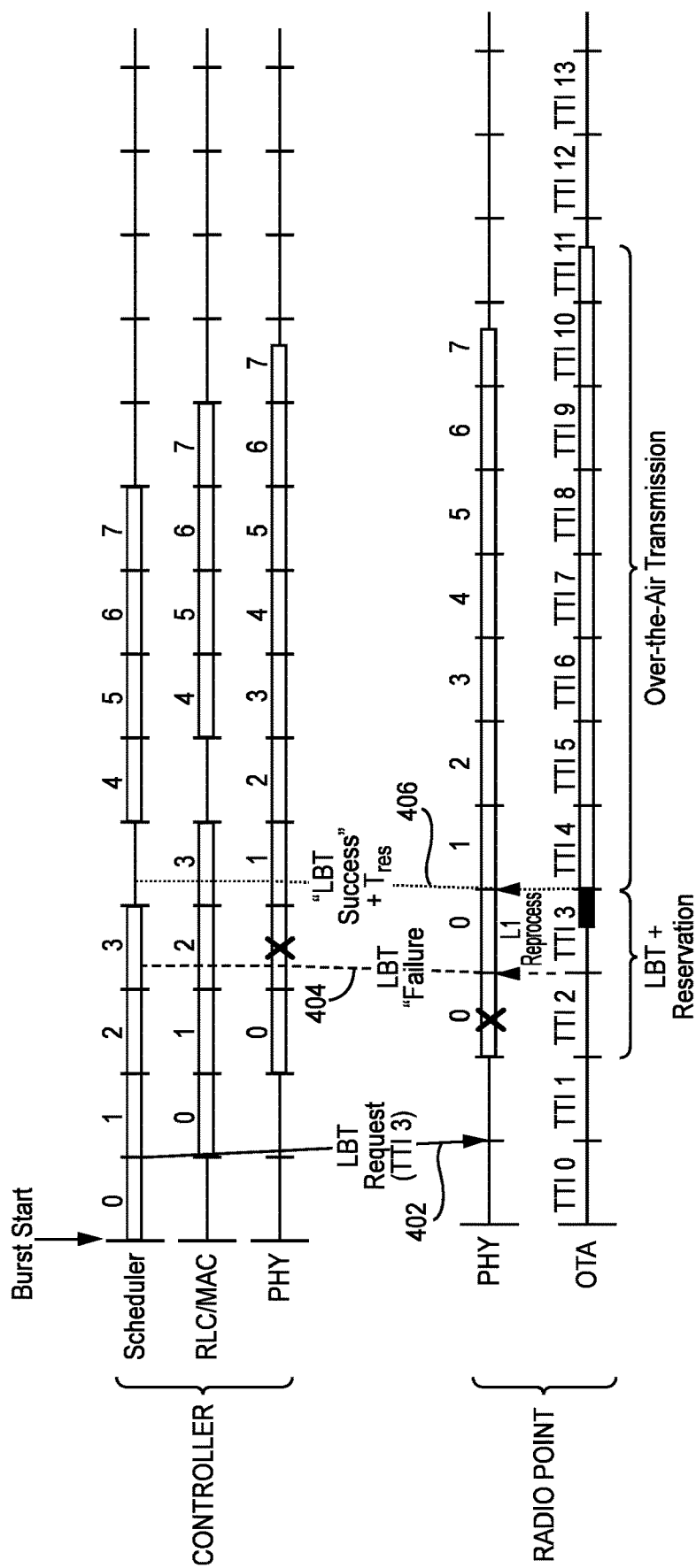
FIG. 4 is one example of a diagram for a burst transmission using LBT priority class 3 and RRC configuration {0} where the initial LBT channel access process is unsuccessful.

FIG. 4 is one example of a diagram for a burst transmission using LBT priority class 3 and RRC configuration {0} where the initial LBT channel access process is unsuccessful. As with the example described in connection with FIG. 3, in this example, after scheduling RBs on a secondary cell Scell in the first TTI 0 of the burst, the L2 scheduler in the serving controller 104 sends an LBT Request indication 402 to the corresponding RP 106 requesting LBT for OTA transmission in TTI 3.

When the initial LBT channel access attempt is not successful in gaining access to the channel in time for a transmission burst to start at or before TTI 3, the RP 106 sends a LBT Failure indication 404 to the serving controller 104 and mutes its transmission in TTI 3.

The RP 106 repeats the LBT channel access process in order to attempt to gain access to the unlicensed channel. In this example, this second attempt is successful and the RP 106 sends a LBT Success indication 406 at the start of TTI 4. In this example, the RP 106 re-processes the first subframe of the burst for transmission before or in TTI 4. To transmit the same PDSCH data in TTI 4, the scrambler and all subsequent transmitter L1 blocks need to be reprocessed. Since in this embodiment the scrambler resides in the RP 106, this can be implemented using the same FEC-coded data received from the controller 104 earlier. The scrambler seed depends on the subframe number (mod 10); therefore, postponing the transmission to another subframe typically requires L1 re-processing.

In addition, a new PDCCH control region needs to be formed, because the PDCCH CCE search windows used by UEs 110 also depend on the subframe number. As shown in FIG. 4, when the initial LBT channel access attempt fails due to a channel busy condition in TTI 2, the RP 106 sends an LBT Failure indication 404 to the controller 104 at the end of TTI 2. When the controller 104 receives the LBT Failure indication 404, it will be in the middle of L1 processing for the 2nd subframe of the burst. It immediately suspends the L1 processing for the 2nd subframe of the burst, and re-processes the control region for the first subframe of the burst, now using the subframe number for TTI 4. If a UE 110 previously scheduled for transmission on TTI 3 cannot be allocated CCEs for transmission on TTI 4, no DCI is transmitted to these UEs. HARQ retransmissions are used to recover the data. Since each RP 106 has its own control region, and no common control packets are transmitted in the 1st subframe of a burst, it is not expected that this failure condition will occur frequently.

As noted above, the downlink L2 and L1 processing is pipelined. Transport Blocks (TBs) scheduled in TTI N−3 by the scheduler that is a part of the L2 functionality 122 in the serving controller 104 are formed by the RLC/MAC processing that is a part of the L2 functionality 122 in TTI N−2 and then processed by the L1 functionality in the controller 104 and the RP 106 in TTI N−1. When the controller 104 receives the LBT Failure indication 404, the L2 scheduler in the controller 104 will have already processed up to 4 subframes of the burst. The L2 functionality 122 in the controller 104 then suspends all scheduling for that RP 106. This can be achieved by simply making all RBUs for the secondary cell associated with that RP 106 unavailable in the D algorithm. If a LBT Success indication is not received for a predetermined number of TTIs, the L2 functionality 122 in the controller 104 will drop the Transport Blocks and trigger a HARQ retransmission. This will also implicitly suspend any RLC/MAC processing for that RP 106 in 1 TTI later, as it will not need to form any TBs for the RP 106 in TTI 5.

It is not necessary to repeat the L2 scheduling and RLC/MAC processing after an LBT deferral. The TBs formed for over-the-air transmission in TTI 3 can be reused in TTI 4. However, this is subject to the following caveats.

A) As discussed above, changing the subframe of a L1 transmission also impacts the PDCCH transmission carrying the DCIs. Since search windows used by the UEs 110 depend on the subframe number, it may not be possible to find CCEs to serve the same UEs 110 in the next subframe. Typically, a LTE L2 scheduler uses its knowledge of the subframe number to ensure that UEs who have RBUs allocated to them will have an available CCE in their search window to transmit the DCI. When the controller 104 cannot form PDCCH packets for certain UEs 110 because of a lack of available CCEs, the UE 110 will not be able to decode the data and HARQ retransmission will be used for recovery.

B) In LAA, common channel logical channels (PCCH, BCCH, and CCCH) are not transmitted on an LAA secondary cell Scell. This simplifies L1 re-processing in case of an LBT failure. However, PSSs and SSSs will be transmitted on LAA secondary cells Scells on subframes 0 and 5 unless the subframe is a partial subframe of less than 12 OFDM symbols. PSSs and SSSs use the middle 6 RBs in the last two symbols of the first slot. In RBs that carry PSSs and SSSs, available REs for PDSCH are reduced by 20%. For LAA secondary cells Scells, the L2 scheduler in the controller 104 does not know exactly in which TTI the first 4 subframes of a burst will be transmitted over the air. Since any of these first 4 subframes may be transmitted on TTIs 0 or 5, the L2 scheduler in the controller 104 may have to assume the presence of PSS/SSS when choosing MCS. When the L1 transmission in any of these first 4 subframes occurs in subframes other than 0 or 5, a slightly suboptimal MCS value may end up being used for UEs 110 that are using the middle 6 RBs. The extra REs available in these non-PSS/SSS subframes can be used to carry additional FEC bits and yield a lower BLER. If scheduling assuming PSS/SSS is deemed too conservative, PSS/SSS can be ignored and not reduce PSS/SSS. This may result in a slight increase in BLER in subframes 0 and 5.

When PDSCH L1 processing creates the coded bits, it should do so assuming no PSS/SSS, and let the L1 functionality in the RP 106 drop certain coded bits when over-the-air transmission occurs in TTIs 0 or 5.

C) Finally, enable coordinated transmission using blanking or TM 10 CoMP can be enabled to reduce interference between UEs 110 served by neighboring RPs 106 that are transmitting with different PCI on the same unlicensed channel, LBT deferral of a transmission to another subframe may destroy the blanking support. Therefore, blanking support cannot be guaranteed in the first 4 subframes of a transmission burst. For example, when RBs assigned to a UE 110 near an RP 106 border is kept blank in the neighbor RP 106, a deferral of the transmission may remove the blanking support if the neighboring RP 106 does not leave the same RBs as blank in the next subframe. In other words, for blanking to be effective, the same RBs need to be left empty in all subframes. This may be handled by choosing a conservative MCS even when blanking is used, and rely on blanking to reduce BLER, not to increase MCS. Blanking support can be used without any problems after LBT feedback is received from the RPs 106 that are involved in blanking.

After scheduling the data for the last subframe of a burst on a secondary cell Scell of an RP 106, the L2 scheduler in the controller 104 can restart a new transmission burst by scheduling data for the same RP 106 in the next subframe. It sends an LBT request to the RP 106. However, depending on the termination time of the previous burst, there may not be enough time for the LBT channel access process to regain access to the unlicensed channel in the next TTI, even when the channel is not busy. This can be handled in the same manner as normal LBT deferral by delaying the start of the next burst to a later TTI following the same procedure described above.

Method 2

An alternative method for handling LBT failures is for the L2 scheduler in the controller 104 to treat the subframes that have already gone out to the RP 106 as successful transmissions (regardless of whether they actually are) and proceed with processing subsequent subframes. This will result in the UE 110, having not received those subframes, not transmitting any ACK/NACK for those subframes, and hence the controller 104 will detect a DTX condition on the relevant ACK/NACK opportunity on the uplink, and process the lost subframes accordingly. This has the advantage of not requiring L1 reprocessing of data at the RP 106. The drawback however is the possibility of the loss of many subframes of data and the subsequent inefficiency.

Handling LBT Channel Access Priority Class 1

Figure 5:
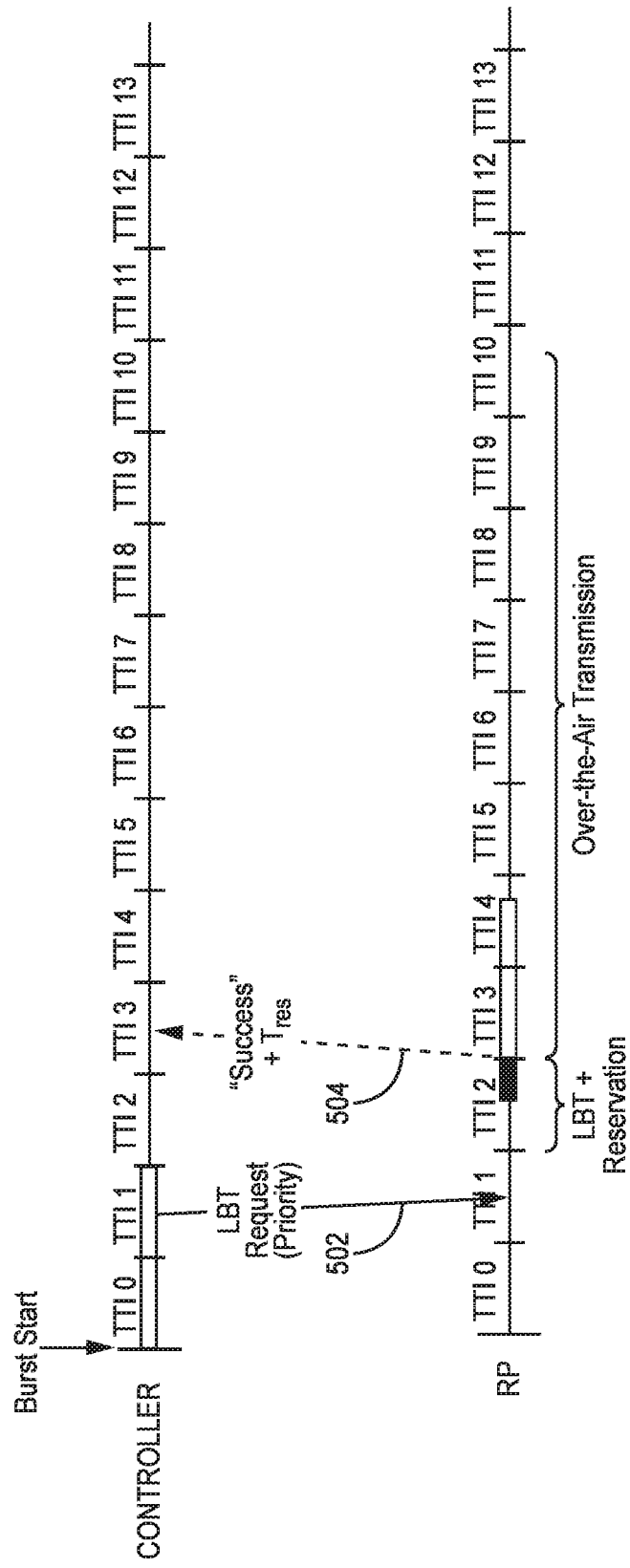
FIG. 5 is one example of a diagram for a burst transmission using LBT priority class 1 and RRC configuration {0} where the initial LBT channel access is successful.

FIG. 5 is one example of a diagram for a burst transmission using LBT priority class 1 and RRC configuration {0} where the initial LBT channel access is successful. For access priority class 1, the maximum transmission duration is 2 milliseconds. This implies that the transmission burst can have at most 2 subframes. Since the duration $T_{res}$ of the reservation signal is unknown at the L2 scheduler in the serving controller 104 at the time it will schedule the second subframe, it cannot determine the maximum number of OFDM symbols in the 2nd subframe based on $T_{res}$. To get around this problem, the L2 scheduler in the controller 104 can use a fixed duration x milliseconds for the second subframe (for example, 9 OFDM symbols). This will impose a maximum $T_{res}$ value to the LBT channel access process in the RP 106, which can be indicated in the LBT Request message 502. The RP 106, upon receiving the LBT request 502, will then initiate the LBT channel access process at a time that will ensure that the maximum allowed $T_{res}$ value will not exceed 1−x. The LBT channel access process in the RP 106 can deal with this situation as follows: it can compute the minimum channel access time $t_{min}$ in milliseconds (<=58 microseconds) based on the Nina value received from the controller 104 and start the LBT channel access process 1−x+$t_{min}$ milliseconds before the start of the next subframe.

In this example, the initial LBT channel access attempt is successful in gaining access to the unlicensed channel in time for a transmission burst to start at or before TTI 3. In response, the RP 106 sends a LBT Success indication 504 to the controller 104 and starts to transmit this burst.

Using a fixed duration for the 2nd subframe of a transmission burst in Access Priority 1 will be slightly suboptimum. In some implementations, the system 100 only supports the use of priority class 3 with LAA, which sidesteps this suboptimality.

Handling RRC Configuration {0, 7}

The scheduling process is similar to that used for the RRC configuration {0, 7}, except in this case, the RP 106 can start the over-the-air transmission at any slot boundary. The L2 scheduler in the controller 104 does not know whether the 1st subframe of the burst will be a full subframe or a half subframe. Therefore, the L2 scheduler will schedule the first subframe of the burst using a conservative MCS value targeting a 10% BLER for a half subframe. The same TB size and MCS can be used for a full subframe.

When the LBT channel access process performed by the RP 106 results in the RP 106 gaining access to the unlicensed channel at the start of the TTI, the timing diagram will look the same as shown in FIG. 3 (which was described above in connection with RRC configuration {0}).

Figure 6:
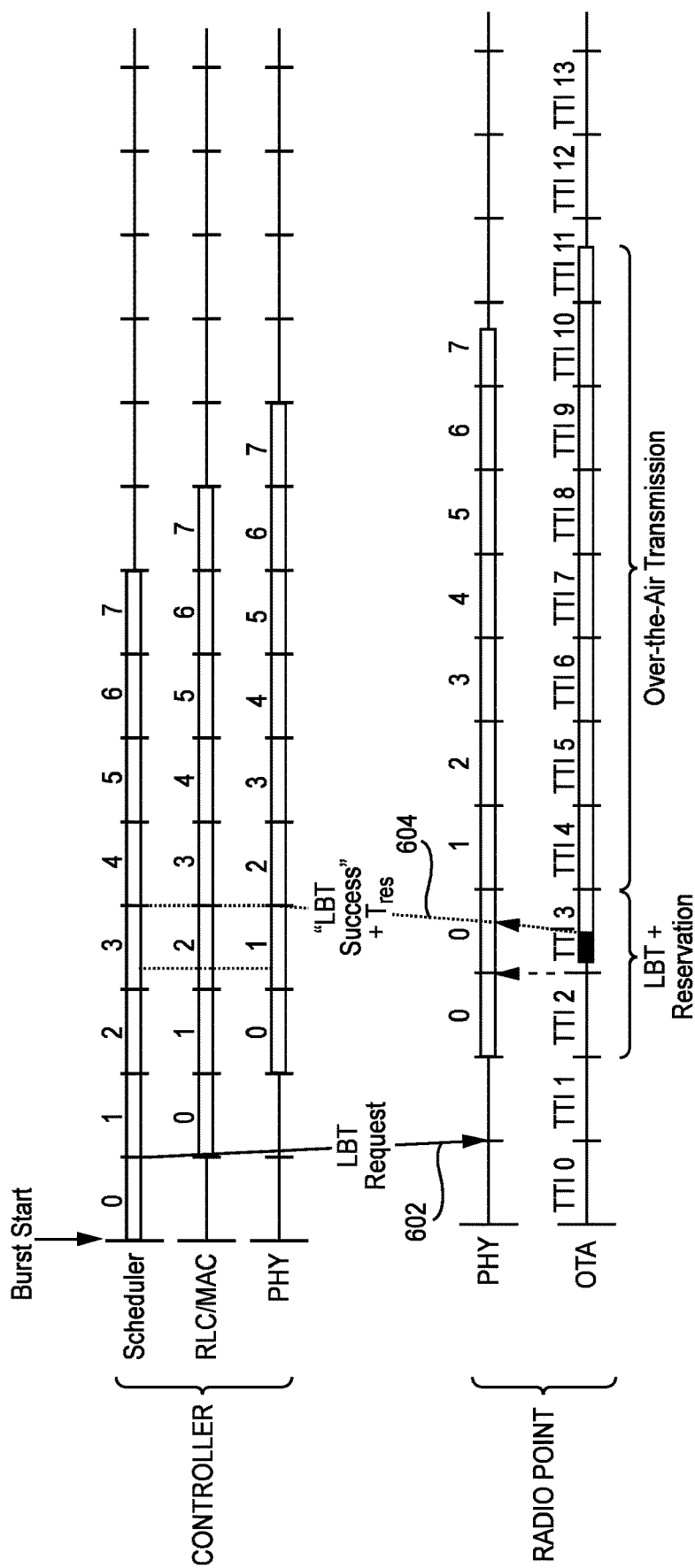
FIG. 6 is one example of a diagram for a burst transmission using RRC configuration {0,7} where the LBT channel access process is successful before the start of the 2nd slot.

If the initial LBT channel access process performed by the RP 106 does not result in the RP 106 gaining access to the unlicensed channel, the L2 scheduler in the controller 104 suspends L1 over-the-air transmission at the start of the TTI. If the LBT channel access process is successful before the start of the 2nd slot (which is the situation shown in FIG. 6), the RP 106 can transmit the 1st slot of the PDSCH and PDCCH IQ data in the 2nd slot. This is possible because PDSCH and PDCCH scrambler depends only on the subframe number, not the slot number. However, the RP 106 must use the reference signals for the 2nd slot of the subframe. In this exemplary embodiment, the L1 processing in the RP 106 typically has 0.5 milliseconds to prepare the half-subframe transmission. Note that it is not necessary to signal the LBT failure at the start of the subframe to the controller 104 since this initial failure can be handled locally at the RP 106. When the LBT channel access process is successful for transmission in the 2nd slot, a LBT Success indication 604 is sent to the controller 104 by the RP 106.

Figure 7:
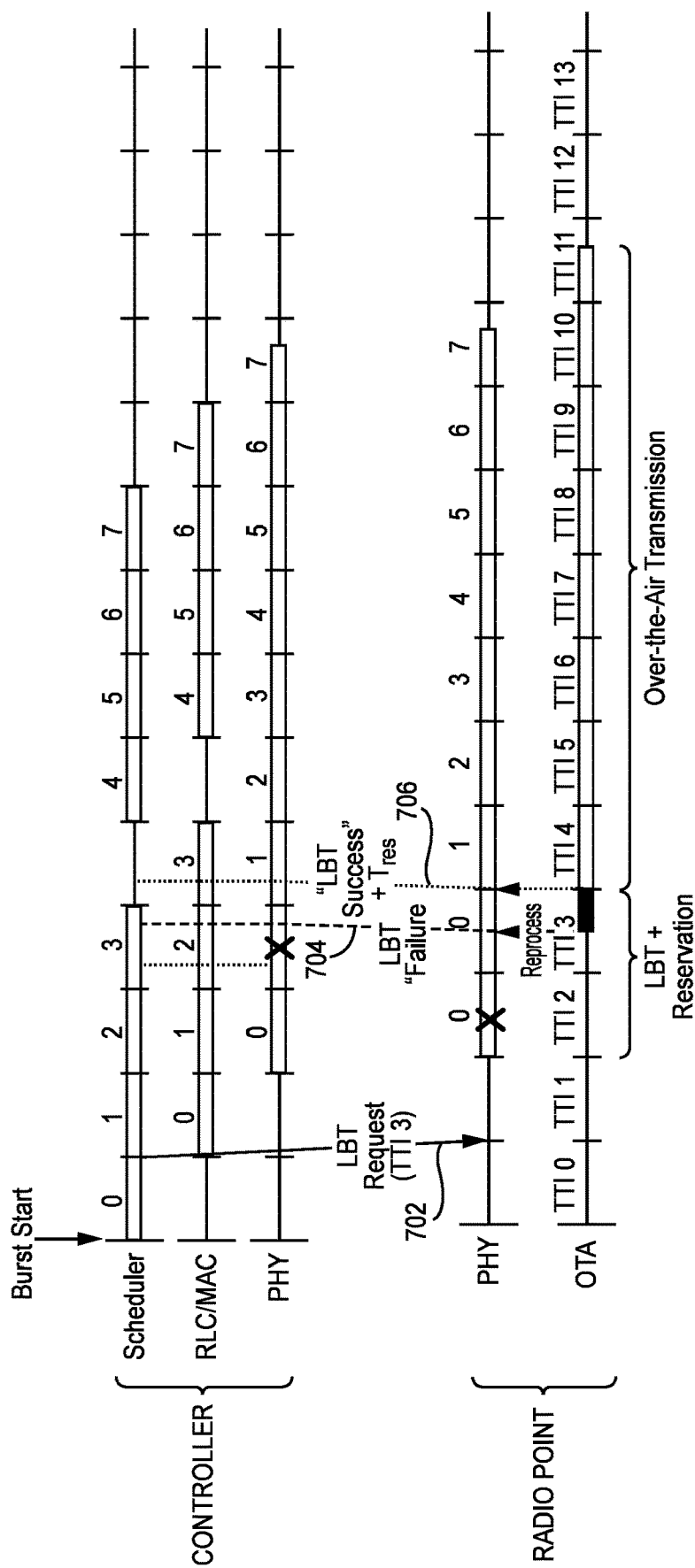
FIG. 7 is one example of a diagram for a burst transmission using RRC configuration {0,7} where the LBT channel access process is unsuccessful before the start of the 2nd slot.

If the LBT channel access process is not successful before the start of the 2nd slot (which is the situation shown in FIG. 7), the RP 106 is configured so that the start of the burst will be delayed at least until the start of the next TTI. The timing diagram for this operation is very similar to the LBT failure scenario for RRC configuration {0} shown in FIG. 4, except here the LBT Failure indication 704 is sent at the start of the 2nd slot of TTI 3. Assuming that the fronthaul delay is less than 250 microseconds, the LBT Failure indication 704 will arrive at the controller 104 before the end of TTI 3 to enable the L2 functionality 122 in the controller 104 to suspend further scheduling on that RP 106.

Baseband Controller Architectures for LAA

In one implementation, each single RP 106 supports three 20 Megahertz (MHz) LAA unlicensed channels and can deliver 450 Megabits-per-second (Mbps) of throughput to a given UE 110 using three LAA unlicensed channels from a single RP 106. It is expected that a higher throughput for a UE 110 can be achieved by aggregating LAA channels across multiple RPs 106. When this is done, a single controller 104 may not be able to support such an aggregated throughput level for a UE 110. One approach to supporting such aggregated throughput levels for a UE 110 is to use multiple controllers 104.

One approach to using multiple controllers 104 to provide additional capacity is shown FIG. 1.

With the approach illustrated in FIG. 1, the system 100 is configured to support "stacking" of multiple controllers 104, where each controller 104 serves a different set of RPs 106 and provides different primary and secondary cells (using different PCIs). For example, in the example shown in FIG. 1, a first controller 104 (controller A) serves a first set of radio points 106 and a first primary cell (Pcell A), and a second controller 104 (controller B) serves a second set of radio points 106 and a second primary cell (Pcell B).

With this approach, coordination between the controllers 104 is used to schedule UEs 110 near cell borders on licensed carriers. If no blanking is used on unlicensed carriers or if RPs 106 near the borders of the coverage areas of the controllers 104 are assigned to different unlicensed channels, scheduler coordination between the controllers 104 may not be needed for unlicensed carriers. In which case, each controller 104 may allocate resources on the unlicensed carriers independently. If neighboring RPs 106 are allowed to operate using the same unlicensed channel, coordination of the LBT channel access process between neighboring RPs 106 can be enabled between controllers 104 as well as coordination of scheduling. With such an approach, when a UE 110 crosses a licensed primary cell border within the site 102, a handover is performed. Coordination is handled at the controller level (that is, each RP 106 need only communicate with its serving controller 104).

This approach provides a straightforward way to expand LAA capacity and throughput using controller stacking.

Figure 8:
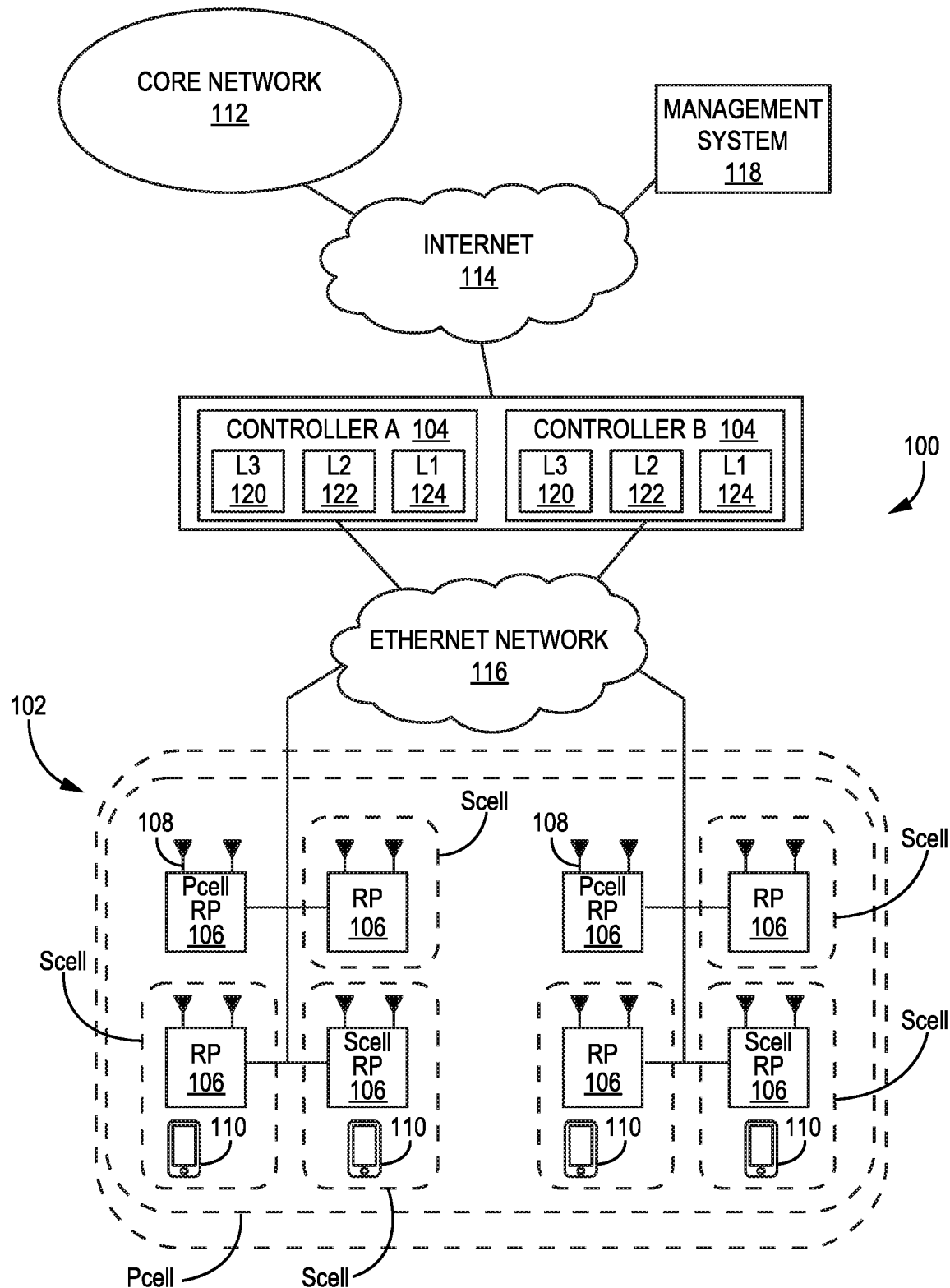
FIG. 8 illustrates another approach to using multiple controllers to provide additional capacity in the RAN of FIG. 1.

FIG. 8 illustrates another approach to using multiple controllers 104 to provide additional capacity in the system 100 of FIG. 1. With the approach illustrated in FIG. 8, the system 100 is configured to support using multiple controllers 104, where the controllers 104 serve the same set of RPs 106 using the same licensed primary cells (using the PCI).

When a UE 110 attempts to connect to the primary cell through one of the RPs 110 by sending PRACH on a licensed carrier, the UE 110 is assigned one of the controllers 104 to be its serving controller 104. Controllers 104 may send load information to RPs 106 to help them balance the load in UE allocation. The assigned serving controller 106 processes that UE 110 during its entire connection. In one implementation, one of the controllers 106 assumes the responsibility of being a "Cell Manager" for the primary cell and handles all common channels. Controllers 104 coordinate their scheduling on the primary cell to share available RBUs and CCEs. RPs 106 receive downlink FEC coded data from both controllers 104 and complete the L1 processing to form the transmitted frequency domain IQ grid. In turn RPs 106 forward uplink PUCCH and PUSCH IQ data to one of the controllers 104 based on pruning instructions received from the controllers 104. On the primary cell, all RPs 106 use the same PCI, and there are no handovers as long as coverage is continuous across the RPs 106 and the site 102. Coordination of the LBT channel access process can be used for the unlicensed channels, if neighboring RPs 106 are allowed to use the same unlicensed channels. Scheduler coordination can be avoided to simplify the design.

With this approach, controllers 104 must also coordinate their scheduling on the unlicensed channels. This is because each of the controllers 104 can schedule RBs on the same RP 104 for different UEs 110. When multiple controllers 104 schedule transmission bursts on a RP 106, all of the controllers 104 need to track the burst state of all the RPs 106. Any of the controllers 104 can initiate a burst, but this can be coordinated between controllers 104 including contention window management. When a RP 106 encounters an LBT deferral into a subsequent subframe, it sends an LBT failure indication to both controllers 104.

The methods and techniques described here may be implemented in digital electronic circuitry, or with a programmable processor (for example, a special-purpose processor or a general-purpose processor such as a computer) firmware, software, or in combinations of them. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs).

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

Example Embodiments

Example 1 includes a system to provide wireless service using one or more licensed radio frequency (RF) channels and one or more unlicensed RF channels, the system comprising: a controller; and a plurality of radio points; wherein each of the radio points is associated with at least one antenna and remotely located from the controller, wherein the plurality of radio points is communicatively coupled to the controller; wherein the controller and the plurality of radio points are configured to implement a base station in order to provide wireless service to a plurality of user equipment (UEs) on a primary cell using said one or more licensed RF channels; wherein the controller is configured to schedule transmissions on said one or more licensed RF channels and said one or more unlicensed RF channels; wherein the controller is communicatively coupled to a core network of a wireless service provider; wherein at least some of the radio points are configured to transmit and receive RF signals to and from the UEs using said one or more licensed RF channels; wherein at least some of the radio points are configured to transmit RF signals to at least some of the UEs using said one or more unlicensed RF channels, each of said at least some of the radio points is configured to use a listen-before-talk (LBT) channel access process to gain access to said one or more unlicensed RF channels; and wherein each of said at least some of the radio points that are configured to transmit RF signals to at least some of the UEs using said or more unlicensed RF channels is configured do the following in response to a request sent by the controller to said radio point to perform the LBT channel access process to attempt to gain access to said one or more unlicensed RF channels in order to transmit a burst starting at or before a first transmission time interval (TTI): if said radio point is successful in gaining access to said one or more unlicensed RF channels in order to transmit the burst starting at or before the first TTI, transmit, on said one or more unlicensed RF channels, the burst starting at or before the first TTI; and if said radio point is unsuccessful in gaining access to said one or more unlicensed RF channels in order to transmit the burst starting at or before the first TTI, not transmit, on said one or more unlicensed RF channels, the burst starting at or before the first TTI, re-process at least some data included in the burst for transmission starting at or before a later TTI, and transmit the burst with the re-processed data starting at or before the later TTI.

Example 2 includes the system of Example 1, wherein if said radio point is unsuccessful in gaining access to said one or more unlicensed RF channels in order to transmit the burst starting at or before the first TTI, sending a failure indication to the controller; and wherein the controller, in response to receiving the failure indication, altering the scheduling of data to be transmitted during the burst to reflect a delay in gaining access to said one or more unlicensed RF channels.

Example 3 includes the system of any of the Examples 1-2, wherein Layer 1 processing for an air interface used for communicating using said one or more unlicensed RF channels is split between the controller and the radio points.

Example 4 includes the system of any of the Examples 1-3, wherein Long-Term Evolution (LTE) Licensed-Assisted Access (LAA) is used for communicating using said one or more unlicensed RF channels.

Example 5 includes the system of any of the Examples 1-4, wherein all of said at least some of the radio points that are configured to transmit and receive RF signals to and from the UEs using said one or more licensed RF channels are configured to use a same primary cell to transmit and receive RF signals using said one or more licensed RF channels; and wherein each of said at least some of the radio points that are configured to transmit RF signals to at least some of the UEs using said one or more unlicensed RF channels is configured to transmit RF signals using a respective different secondary cell using said one or more unlicensed RF channels.

Example 6 includes the system of any of the Examples 1-5, wherein the system comprises a plurality of controllers; and wherein each of the plurality of controllers is: associated with a respective different set of radio points; configured to use a respective primary cell associated with only said controller to provide wireless service using said one or more licensed RF channels; and configured to use a respective different secondary cell for each radio point that is used by said controller to provide wireless service using said one or more unlicensed RF channels.

Example 7 includes the system of any of the Examples 1-6, wherein the system comprises a plurality of controllers; and wherein the plurality of controllers is: associated with the same set of radio points; configured to all use a same primary cell to provide wireless service using said one or more licensed RF channels; and configured to use a respective different secondary cell for each radio point that is used by the controllers to provide wireless service using said one or more unlicensed RF channels.

Example 8 includes the system of any of the Examples 1-7, wherein the system comprises a plurality of controllers; wherein the controllers are configured to schedule transmissions on said one or more licensed RF channels and said one or more unlicensed RF channels; and wherein the controllers are configured to coordinate scheduling of transmissions on said one or more unlicensed RF channels.

Example 9 includes the system of Example 8, wherein the controllers are configured to coordinate the use of the LBT channel access process among the radio points.

Example 10 includes the system of any of the Examples 1-9, wherein the controller is communicatively coupled to the radio points using a switched ETHERNET network.

Example 11 includes the system of any of the Examples 1-10, wherein the plurality of radio points comprises at least one of: a radio point configured to use only said one or more licensed RF channels; a radio point configured to use only said one or more unlicensed RF channels; and a radio point configured to use both said one or more licensed RF channels and said one or more unlicensed RF channels.

Example 12 includes a method of providing wireless service using one or more licensed radio frequency (RF) channels and one or more unlicensed RF channels via a system comprising a controller and a plurality of radio points, wherein each of the radio points is associated with at least one antenna and remotely located from the controller, wherein the plurality of radio points is communicatively coupled to the controller, wherein the controller and the plurality of radio points are configured to implement a base station in order to provide wireless service to a plurality of user equipment (UEs) on a primary cell using said one or more licensed RF channels, wherein the controller is communicatively coupled to a core network of a wireless service provider, wherein at least some of the radio points are configured to transmit and receive RF signals to and from the UEs using said one or more licensed RF channels, the method comprising: scheduling, by the controller, transmissions on said one or more licensed RF channels and said one or more unlicensed RF channels; using, by at least some of the radio points that are configured to transmit RF signals to at least some of the UEs using said one or more unlicensed RF channels, a listen-before-talk (LBT) channel access process to gain access to said one or more unlicensed RF channels; and in response to a request sent by the controller to, each of said at least some of the radio points that are configured to transmit RF signals to at least some of the UEs using said or more unlicensed RF channels, to perform the LBT channel access process in order to attempt to gain access to said one or more unlicensed RF channels in order to transmit a burst starting at or before a first transmission time interval (TTI): if said radio point is successful in gaining access to said one or more unlicensed RF channels in order to transmit the burst starting at or before the first TTI, transmitting, on said one or more unlicensed RF channels, the burst starting at or before the first TTI; and if said radio point is unsuccessful in gaining access to said one or more unlicensed RF channels in order to transmit the burst starting at or before the first TTI, not transmitting, on said one or more unlicensed RF channels, the burst starting at or before the first TTI, re-processing at least some data included in the burst for transmission starting at or before a later TTI, and transmitting the burst with the re-processed data starting at or before the later TTI.

Example 13 includes a system to provide wireless service using one or more licensed radio frequency (RF) channels and one or more unlicensed RF channels, the system comprising: a controller; and a plurality of radio points; wherein each of the radio points is associated with at least one antenna and remotely located from the controller, wherein the plurality of radio points is communicatively coupled to the controller; wherein the controller and the plurality of radio points are configured to implement a base station to provide wireless service to a plurality of user equipment (UEs) on a primary cell using said one or more licensed RF channels; wherein the controller is configured to schedule transmissions on said one or more licensed RF channels and said one or more unlicensed RF channels; wherein the controller is communicatively coupled to a core network of a wireless service provider; wherein at least some of the radio points are configured to transmit and receive RF signals to and from the UEs using said one or more licensed RF channels; wherein at least some of the radio points are configured to transmit RF signals to at least some of the UEs using said one or more unlicensed RF channels, each of said at least some of the radio points is configured to use a listen-before-talk (LBT) channel access process to gain access to said one or more unlicensed RF channels; wherein each of said at least some of the radio points that are configured to transmit RF signals to at least some of the UEs using said or more unlicensed RF channels is configured do the following in response to a request sent by the controller to said radio point to perform the LBT channel access process to attempt to gain access to said one or more unlicensed RF channels in order to transmit a burst starting at or before a first transmission time interval (TTI), the burst including first data scheduled to be transmitted before or during the first TTI: if said radio point is successful in gaining access to said one or more unlicensed RF channels in order to transmit the burst starting at or before the first transmission time interval (TTI), transmit, on said one or more unlicensed RF channels, the burst starting at or before the first TTI; and if said radio point is unsuccessful in gaining access to said one or more unlicensed RF channels in order to transmit the burst starting at or before the first TTI, not transmit, on said one or more unlicensed RF channels, the first data as a part of the burst and transmit, on said one or more unlicensed RF channels, other data scheduled to be transmitted during the burst after the first TTI; and wherein the controller is configured to retransmit from said radio point, on said one or more unlicensed RF channels, the first data in response to a failure to receive at the controller an acknowledgment sent from a UE in response to receiving the first data.

Example 14 includes the system of Example 13, wherein the controller is configured to retransmit from said radio point, on said one or more unlicensed RF channels, the first data in response to a failure to receive at the controller an acknowledgment sent from a UE, one said one or more licensed RF channels, in response to receiving the first data.

Example 15 includes the system of any of the Examples 13-14, wherein if said radio point is unsuccessful in gaining access to said one or more unlicensed RF channels in order to transmit the burst starting at or before the first TTI, sending a failure indication to the controller; and wherein the controller, in response to receiving the failure indication, altering the scheduling of data to be transmitted during the burst to reflect a delay in gaining access to said one or more unlicensed RF channels.

Example 16 includes the system of any of the Examples 13-15, wherein Layer 1 processing for an air interface used for communicating using said one or more unlicensed RF channels is split between the controller and the radio points.

Example 17 includes the system of any of the Examples 13-16, wherein Long-Term Evolution (LTE) Licensed-Assisted Access (LAA) is used for communicating using said one or more unlicensed RF channels.

Example 18 includes the system of any of the Examples 13-17, wherein all of said at least some of the radio points that are configured to transmit and receive RF signals to and from the UEs using said one or more licensed RF channels are configured to use a same primary cell to transmit and receive RF signals on said one or more licensed RF channels; and wherein each of said at least some of the radio points that are configured to transmit RF signals to at least some of the UEs using said one or more unlicensed RF channels is configured to transmit RF signals using a respective different secondary cell using said one or more unlicensed RF channels.

Example 19 includes the system of any of the Examples 13-18, wherein the system comprises a plurality of controllers; and wherein each of the plurality of controllers is: associated with a respective different set of radio points; configured to use a respective primary cell associated with only said controller to provide wireless service using said one or more licensed RF channels; and configured to use a respective different secondary cell for each radio point that is used by said controller to provide wireless service using said one or more unlicensed RF channels.

Example 20 includes the system of any of the Examples 13-19, wherein the system comprises a plurality of controllers; and wherein the plurality of controllers is: associated with the same set of radio points; configured to all use a same primary cell to provide wireless service using said one or more licensed RF channels; and configured to use a respective different secondary cell for each radio point that is used by the controllers to provide wireless service using said one or more unlicensed RF channels.

Example 21 includes the system of any of the Examples 13-20, wherein the system comprises a plurality of controllers; wherein the controllers are configured to schedule transmissions on said one or more licensed RF channels and said one or more unlicensed RF channels; and wherein the controllers are configured to coordinate scheduling of transmissions on said one or more unlicensed RF channels.

Example 22 includes the system of Example 21, wherein the controllers are configured to coordinate the use of the LBT channel access process among the radio points.

Example 23 includes the system of any of the Examples 13-22, wherein the controller is communicatively coupled to the radio points using a switched ETHERNET network.

Example 24 includes the system of any of the Examples 13-23, wherein the plurality of radio points comprises at least one of: a radio point configured to use only said one or more licensed RF channels; a radio point configured to use only said one or more unlicensed RF channels; and a radio point configured to use both said one or more licensed RF channels and said one or more unlicensed RF channels.

Example 25 includes a method of providing wireless service using one or more licensed radio frequency (RF) channels and one or more unlicensed RF channels via a system comprising a controller and a plurality of radio points, wherein each of the radio points is associated with at least one antenna and remotely located from the controller, wherein the plurality of radio points is communicatively coupled to the controller, wherein the controller and the plurality of radio points are configured to implement a base station in order to provide wireless service to a plurality of user equipment (UEs) on a primary cell using said one or more licensed RF channels, wherein the controller is communicatively coupled to a core network of a wireless service provider, wherein at least some of the radio points are configured to transmit and receive RF signals to and from the UEs using said one or more licensed RF channels, the method comprising: scheduling, by the controller, transmissions on said one or more licensed RF channels and said one or more unlicensed RF channels; using, by at least some of the radio points that are configured to transmit RF signals to at least some of the UEs using said one or more unlicensed RF channels, a listen-before-talk (LBT) channel access process to gain access to said one or more unlicensed RF channels; and in response to a request sent by the controller to, each of said at least some of the radio points that are configured to transmit RF signals to at least some of the UEs using said or more unlicensed RF channels is configured do the following, to perform the LBT channel access process in order to attempt to gain access to said one or more unlicensed RF channels in order to transmit a burst starting at or before a first transmission time interval (TTI), the burst including first data scheduled to be transmitted before or during the first TTI: if said radio point is successful in gaining access to said one or more unlicensed RF channels in order to transmit the burst starting at or before the first transmission time interval (TTI), transmitting, on said one or more unlicensed RF channels, the burst starting at or before the first TTI; and if said radio point is unsuccessful in gaining access to said one or more unlicensed RF channels in order to transmit the burst starting at or before the first TTI, not transmitting, on said one or more unlicensed RF channels, the first data as a part of the burst and transmitting, on said one or more unlicensed RF channels, other data scheduled to be transmitted during the burst after the first TTI; and retransmitting from said radio point, on said one or more unlicensed RF channels, the first data in response to a failure to receive at the controller an acknowledgment sent from a UE in response to receiving the first data.

What is claimed is:

1. A system to provide wireless service using one or more licensed radio frequency (RF) channels and one or more unlicensed RF channels, the system comprising:
   a controller; and
   a radio point;
   wherein the radio point is associated with at least one antenna and remotely located from the controller, wherein the radio point is communicatively coupled to the controller;
   wherein the controller and the radio point are configured to implement a base station in order to provide wireless service to a plurality of user equipment (UEs) on a primary cell using said one or more licensed RF channels;
   wherein the controller is configured to schedule transmissions on said one or more licensed RF channels and said one or more unlicensed RF channels;
   wherein the controller is communicatively coupled to a core network of a wireless service provider;
   wherein the radio point is configured to transmit and receive RF signals to and from the UEs using said one or more licensed RF channels;
   wherein the radio point is configured to transmit RF signals to at least some of the UEs using said one or more unlicensed RF channels and wherein the radio point is configured to use a listen-before-talk (LBT) channel access process to gain access to said one or more unlicensed RF channels; and
   wherein the radio point is configured do the following in response to a request sent by the controller to the radio point to perform the LBT channel access process to attempt to gain access to said one or more unlicensed RF channels in order to transmit a burst starting at or before a first transmission time interval (TTI):
      if the radio point is successful in gaining access to said one or more unlicensed RF channels in order to transmit the burst starting at or before the first TTI, transmit, on said one or more unlicensed RF channels, the burst starting at or before the first TTI; and
      if the radio point is unsuccessful in gaining access to said one or more unlicensed RF channels in order to transmit the burst starting at or before the first TTI, not transmit, on said one or more unlicensed RF channels, the burst starting at or before the first TTI, re-process at least some data included in the burst for transmission starting at or before a later TTI, and transmit the burst with the re-processed data starting at or before the later TTI.

2. The system of claim 1, wherein if the radio point is unsuccessful in gaining access to said one or more unlicensed RF channels in order to transmit the burst starting at or before the first TTI, sending a failure indication to the controller; and
   wherein the controller, in response to receiving the failure indication, altering the scheduling of data to be transmitted during the burst to reflect a delay in gaining access to said one or more unlicensed RF channels.

3. The system of claim 1, wherein Layer 1 processing for an air interface used for communicating using said one or more unlicensed RF channels is split between the controller and the radio point.

4. The system of claim 1, wherein Long-Term Evolution (LTE) Licensed-Assisted Access (LAA) is used for communicating using said one or more unlicensed RF channels.

5. The system of claim 1, further comprising a plurality of radio points;
   wherein each of the radio points is associated with a respective at least one antenna and remotely located from the controller, wherein the plurality of radio points is communicatively coupled to the controller.

6. The system of claim 5, wherein all of at least some of the radio points are configured to transmit and receive RF signals to and from the UEs using a same primary cell to transmit and receive RF signals using said one or more licensed RF channels; and
   wherein each of said at least some of the radio points is configured to transmit RF signals using a respective different secondary cell using said one or more unlicensed RF channels.

7. The system of claim 5, wherein the system comprises a plurality of controllers; and
   wherein each individual controller included in the plurality of controllers is:
      associated with a respective different set of radio points;
      configured to use a respective primary cell associated with only said individual controller to provide wireless service using said one or more licensed RF channels; and configured to use a respective different secondary cell for each radio point that is used by said individual controller to provide wireless service using said one or more unlicensed RF channels.

8. The system of claim 5, wherein the system comprises a plurality of controllers; and
wherein the plurality of controllers is:
associated with a same set of radio points;
configured to all use a same primary cell to provide wireless service using said one or more licensed RF channels; and
configured to use a respective different secondary cell for each radio point that is used by the controllers to provide wireless service using said one or more unlicensed RF channels.

9. The system of claim 5, wherein the system comprises a plurality of controllers;
wherein the controllers are configured to schedule transmissions on said one or more licensed RF channels and said one or more unlicensed RF channels; and
wherein the controllers are configured to coordinate scheduling of transmissions on said one or more unlicensed RF channels.

10. The system of claim 9, wherein the controllers are configured to coordinate the use of the LBT channel access process among the radio points.

11. The system of claim 1, wherein the controller is communicatively coupled to the radio point using a switched ETHERNET network.

12. The system of claim 1, wherein the radio point comprises at least one of:
a radio point configured to use only said one or more licensed RF channels;
a radio point configured to use only said one or more unlicensed RF channels; and
a radio point configured to use both said one or more licensed RF channels and said one or more unlicensed RF channels.

13. A method of providing wireless service using one or more licensed radio frequency (RF) channels and one or more unlicensed RF channels via a system comprising a controller and a radio point, wherein the radio point is associated with at least one antenna and remotely located from the controller, wherein the radio point is communicatively coupled to the controller, wherein the controller and the radio point are configured to implement a base station in order to provide wireless service to a plurality of user equipment (UEs) on a primary cell using said one or more licensed RF channels, wherein the controller is communicatively coupled to a core network of a wireless service provider, wherein the radio point is configured to transmit and receive RF signals to and from the UEs using said one or more licensed RF channels, the method comprising:
scheduling, by the controller, transmissions on said one or more licensed RF channels and said one or more unlicensed RF channels;
using, by the radio point, a listen-before-talk (LBT) channel access process to gain access to said one or more unlicensed RF channels; and
in response to a request sent by the controller to radio point to perform the LBT channel access process in order to attempt to gain access to said one or more unlicensed RF channels in order to transmit a burst starting at or before a first transmission time interval (TTI):
if the radio point is successful in gaining access to said one or more unlicensed RF channels in order to transmit the burst starting at or before the first TTI, transmitting, on said one or more unlicensed RF channels, the burst starting at or before the first TTI; and
if the radio point is unsuccessful in gaining access to said one or more unlicensed RF channels in order to transmit the burst starting at or before the first TTI, not transmitting, on said one or more unlicensed RF channels, the burst starting at or before the first TTI, re-processing at least some data included in the burst for transmission starting at or before a later TTI, and transmitting the burst with the re-processed data starting at or before the later TTI.

14. A system to provide wireless service using one or more licensed radio frequency (RF) channels and one or more unlicensed RF channels, the system comprising:
a controller; and
a radio point;
wherein the radio point is associated with at least one antenna and remotely located from the controller, wherein the radio point is communicatively coupled to the controller;
wherein the controller and the radio point are configured to implement a base station to provide wireless service to a plurality of user equipment (UEs) on a primary cell using said one or more licensed RF channels;
wherein the controller is configured to schedule transmissions on said one or more licensed RF channels and said one or more unlicensed RF channels;
wherein the controller is communicatively coupled to a core network of a wireless service provider;
wherein the radio point is configured to transmit and receive RF signals to and from the UEs using said one or more licensed RF channels;
wherein the radio point is configured to transmit RF signals to at least some of the UEs using said one or more unlicensed RF channels and wherein the radio point is configured to use a listen-before-talk (LBT) channel access process to gain access to said one or more unlicensed RF channels;
wherein the radio point is configured do the following in response to a request sent by the controller to the radio point to perform the LBT channel access process to attempt to gain access to said one or more unlicensed RF channels in order to transmit a burst starting at or before a first transmission time interval (TTI), the burst including first data scheduled to be transmitted before or during the first TTI:
if the radio point is successful in gaining access to said one or more unlicensed RF channels in order to transmit the burst starting at or before the first transmission time interval (TTI), transmit, on said one or more unlicensed RF channels, the burst starting at or before the first TTI; and
if the radio point is unsuccessful in gaining access to said one or more unlicensed RF channels in order to transmit the burst starting at or before the first TTI, not transmit, on said one or more unlicensed RF channels, the first data as a part of the burst and transmit, on said one or more unlicensed RF channels, other data scheduled to be transmitted during the burst after the first TTI; and
wherein the controller is configured to retransmit from the radio point, on said one or more unlicensed RF channels, the first data in response to a failure to receive at the controller an acknowledgment sent from a UE in response to receiving the first data.

15. The system of claim 14, wherein the controller is configured to retransmit from the radio point, on said one or more unlicensed RF channels, the first data in response to a failure to receive at the controller an acknowledgment sent from a UE, one said one or more licensed RF channels, in response to receiving the first data.

16. The system of claim 14, wherein if the radio point is unsuccessful in gaining access to said one or more unlicensed RF channels in order to transmit the burst starting at or before the first TTI, sending a failure indication to the controller; and
wherein the controller, in response to receiving the failure indication, altering the scheduling of data to be transmitted during the burst to reflect a delay in gaining access to said one or more unlicensed RF channels.

17. The system of claim 14, wherein Layer 1 processing for an air interface used for communicating using said one or more unlicensed RF channels is split between the controller and the radio point.

18. The system of claim 14, wherein Long-Term Evolution (LTE) Licensed-Assisted Access (LAA) is used for communicating using said one or more unlicensed RF channels.

19. The system of claim 14, further comprising a plurality of radio points;
wherein each of the radio points is associated with a respective at least one antenna and remotely located from the controller, wherein the plurality of radio points is communicatively coupled to the controller.

20. The system of claim 19, wherein all of at least some of the radio points are configured to transmit and receive RF signals to and from the UEs using a same primary cell to transmit and receive RF signals on said one or more licensed RF channels; and
wherein each of said at least some of the radio points is configured to transmit RF signals using a respective different secondary cell using said one or more unlicensed RF channels.

21. The system of claim 19, wherein the system comprises a plurality of controllers; and
wherein each individual controller included in the plurality of controllers is:
associated with a respective different set of radio points;
configured to use a respective primary cell associated with only said individual controller to provide wireless service using said one or more licensed RF channels; and
configured to use a respective different secondary cell for each radio point that is used by said individual controller to provide wireless service using said one or more unlicensed RF channels.

22. The system of claim 19, wherein the system comprises a plurality of controllers; and
wherein the plurality of controllers is:
associated with a same set of radio points;
configured to all use a same primary cell to provide wireless service using said one or more licensed RF channels; and
configured to use a respective different secondary cell for each radio point that is used by the controllers to provide wireless service using said one or more unlicensed RF channels.

23. The system of claim 19, wherein the system comprises a plurality of controllers;
wherein the controllers are configured to schedule transmissions on said one or more licensed RF channels and said one or more unlicensed RF channels; and
wherein the controllers are configured to coordinate scheduling of transmissions on said one or more unlicensed RF channels.

24. The system of claim 23, wherein the controllers are configured to coordinate the use of the LBT channel access process among the radio points.

25. The system of claim 14, wherein the controller is communicatively coupled to the radio point using a switched ETHERNET network.

26. The system of claim 14, wherein the radio point comprises at least one of:
a radio point configured to use only said one or more licensed RF channels;
a radio point configured to use only said one or more unlicensed RF channels; and
a radio point configured to use both said one or more licensed RF channels and said one or more unlicensed RF channels.

27. A method of providing wireless service using one or more licensed radio frequency (RF) channels and one or more unlicensed RF channels via a system comprising a controller and a radio point, wherein the radio point is associated with at least one antenna and remotely located from the controller, wherein the radio point is communicatively coupled to the controller, wherein the controller and the radio point are configured to implement a base station in order to provide wireless service to a plurality of user equipment (UEs) on a primary cell using said one or more licensed RF channels, wherein the controller is communicatively coupled to a core network of a wireless service provider, wherein the radio point is configured to transmit and receive RF signals to and from the UEs using said one or more licensed RF channels, the method comprising:
scheduling, by the controller, transmissions on said one or more licensed RF channels and said one or more unlicensed RF channels;
using, by the radio point, a listen-before-talk (LBT) channel access process to gain access to said one or more unlicensed RF channels;
doing the following in response to a request sent by the controller, to the radio point, to perform the LBT channel access process in order to attempt to gain access to said one or more unlicensed RF channels in order to transmit a burst starting at or before a first transmission time interval (TTI), the burst including first data scheduled to be transmitted before or during the first TTI:
if the radio point is successful in gaining access to said one or more unlicensed RF channels in order to transmit the burst starting at or before the first transmission time interval (TTI), transmitting, on said one or more unlicensed RF channels, the burst starting at or before the first TTI; and
if the radio point is unsuccessful in gaining access to said one or more unlicensed RF channels in order to transmit the burst starting at or before the first TTI, not transmitting, on said one or more unlicensed RF channels, the first data as a part of the burst and transmitting, on said one or more unlicensed RF channels, other data scheduled to be transmitted during the burst after the first TTI; and
retransmitting from the radio point, on said one or more unlicensed RF channels, the first data in response to a failure to receive at the controller an acknowledgment sent from a UE in response to receiving the first data.

* * * * *